United States Patent
You et al.

(10) Patent No.: US 12,232,177 B2
(45) Date of Patent: Feb. 18, 2025

(54) RANDOM ACCESS METHOD AND COMMUNICATION APPARATUS

(71) Applicant: HUAWEI TECHNOLOGIES CO., LTD., Shenzhen (CN)

(72) Inventors: Chunhua You, Shanghai (CN); Qufang Huang, Shenzhen (CN); Xiaoying Xu, Shanghai (CN); Yinghao Guo, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 17/563,815

(22) Filed: Dec. 28, 2021

(65) Prior Publication Data

US 2022/0124826 A1 Apr. 21, 2022

Related U.S. Application Data

(63) Continuation of application No. PCT/CN2020/098394, filed on Jun. 28, 2020.

(30) Foreign Application Priority Data

Jun. 28, 2019 (CN) .......................... 201910573570.2

(51) Int. Cl.
*H04W 74/0833* (2024.01)
(52) U.S. Cl.
CPC ............................... *H04W 74/0833* (2013.01)
(58) Field of Classification Search
None
See application file for complete search history.

(56) References Cited

U.S. PATENT DOCUMENTS

| | | | |
|---|---|---|---|
| 2010/0278131 | A1 | 11/2010 | Jeong et al. |
| 2016/0309521 | A1 | 10/2016 | Jeong et al. |

(Continued)

FOREIGN PATENT DOCUMENTS

| | | |
|---|---|---|
| CN | 107027190 A | 8/2017 |
| CN | 108282901 A | 7/2018 |

(Continued)

OTHER PUBLICATIONS

Email Discussion Rapporteur (ZTE), "Procedures and mgsB content [105bis#30][NR/2-step RACH]," 3GPP TSG-WG2 Meeting #106, Reno, USA, R2-1906308, total 91 pages, 3rd Generation Partnership Project, Valbonne, France (May 13-17, 2019).

(Continued)

*Primary Examiner* — Marcus Smith
(74) *Attorney, Agent, or Firm* — Leydig, Voit & Mayer, Ltd.

(57) ABSTRACT

This application provides a random access method and a communication apparatus. The method includes: receiving, by a terminal device, a response message from a network device; determining, by the terminal device, a message format of the response message, where the message format includes a first format or a second format; and parsing, by the terminal device, the response message based on the determined message format, where the response message in the first format includes a contention resolution identity and a control plane message; and the response message in the second format includes a contention resolution identity and includes no control plane message. A two-step random access method provided in this application includes two message formats of a random access response.

20 Claims, 11 Drawing Sheets

(56) References Cited

U.S. PATENT DOCUMENTS

| | | | | |
|---|---|---|---|---|
| 2020/0107371 A1* | 4/2020 | Kunt | .................. | H04W 74/0833 |
| 2020/0267772 A1* | 8/2020 | Jung | .................. | H04W 74/004 |
| 2021/0307082 A1* | 9/2021 | Wang | .................. | H04W 72/1263 |
| 2021/0329559 A1* | 10/2021 | Huang | .................. | H04W 76/28 |
| 2021/0410191 A1* | 12/2021 | Wu | .................. | H04W 74/0833 |
| 2022/0225428 A1* | 7/2022 | Xiong | .................. | H04L 1/1864 |
| 2022/0264638 A1* | 8/2022 | Qiu | .................. | H04W 72/0446 |

FOREIGN PATENT DOCUMENTS

| | | |
|---|---|---|
| CN | 109152045 A | 1/2019 |
| EP | 3952501 A1 | 2/2022 |
| WO | 2015063593 A2 | 5/2015 |

OTHER PUBLICATIONS

Etri, "Contention resolution and SRB/DRB delivery for 2-step RACH," 3GPP TSG-RAN WG2 Meeting #106, Reno, USA, R2-1906746, total 2 pages, 3rd Generation Partnership Project, Valbonne, France (May 13-17, 2019).

Intel Corporation, "Consideration of MsgB contents and design," 3GPP TSG RAN WG2 #106, Reno, Nevada, US, R2-1906280, total 6 pages, 3rd Generation Partnership Project, Valbonne, France (May 13-17, 2019).

Huawei, HiSilicon, "Correction on configuration of pucch-ResourceCommon," 3GPP TSG-RAN WG2 #106, Reno, USA, R2-1908287, total 3 pages, 3rd Generation Partnership Project, Valbonne, France (May 13-17, 2019).

Ericsson, "Multiplexing and MsgB in 2-step RA," 3GPP TSG-RAN WG2 #106, Reno, USA, Tdoc R2-1906952, total 3 pages, 3rd Generation Partnership Project, Valbonne, France (May 13-17, 2019).

3GPP TSG RAN WG2, "Ls on overall procedure for 2-step RACH," 3GPP TSG RAN WG2#106, Reno, Nevada, USA, R2-1908481, total 2 pages, 3rd Generation Partnership Project, Valbonne, France (May 13-17, 2019).

Intel Corporation, "Procedure for two-step RACH," 3GPP TSG RAN WG2#105bis, Xi'an, China, R2-1904439, total 7 pages, 3rd Generation Partnership Project, Valbonne, France (Apr. 8-12, 2019).

Catt, "Reception of Msg2 and msgB," 3GPP TSG-RAN2 Meeting #106, Reno, USA, R2-1905754, total 6 pages, 3rd Generation Partnership Project, Valbonne, France (May 13-17, 2019).

"3rd Generation Partnership Project; Technical Specification Group Radio Access Network; NR; Medium Access Control (MAC) protocol specification (Release 15)," 3GPP TS 38.321 V15.6.0, total 78 pages, 3rd Generation Partnership Project, Valbonne, France (Jun. 2019).

"3rd Generation Partnership Project; Technical Specification Group Radio Access Network; NR; Physical layer procedures for control (Release 15)," 3GPP TS 38.213 V15.6.0, total 107 pages, 3rd Generation Partnership Project, Valbonne, France (Jun. 2019).

* cited by examiner

| | | | | | | | |
|---|---|---|---|---|---|---|---|

| R | Timing advance command | Oct 1 |
|---|---|---|
| Timing advance command | Uplink grant | Oct 2 |
| Uplink grant | | Oct 3 |
| Uplink grant | | Oct 4 |
| Uplink grant | | Oct 5 |
| Temporary C-RNTI | | Oct 6 |
| Temporary C-RNTI | | Oct 7 |
| Contention resolution identity | | Oct 8 |
| Contention resolution identity | | Oct 9 |
| Contention resolution identity | | Oct 10 |
| Contention resolution identity | | Oct 11 |
| Contention resolution identity | | Oct 12 |
| Contention resolution identity | | Oct 13 |

FIG. 11

| | | | | | | | | |
|---|---|---|---|---|---|---|---|---|
| Temporary C-RNTI | | | | | | | | Oct 1 |
| Temporary C-RNTI | | | | | | | | Oct 2 |
| Contention resolution identity | | | | | | | | Oct 3 |
| Contention resolution identity | | | | | | | | Oct 4 |
| Contention resolution identity | | | | | | | | Oct 5 |
| Contention resolution identity | | | | | | | | Oct 6 |
| Contention resolution identity | | | | | | | | Oct 7 |
| Contention resolution identity | | | | | | | | Oct 8 |

FIG. 14

| R | | | Uplink grant | | | | | Oct 1 |
|---|---|---|---|---|---|---|---|---|
| Uplink grant | | | | | | | | Oct 2 |
| Uplink grant | | | | | | | | Oct 3 |
| Uplink grant | | | | | | | | Oct 4 |
| Contention resolution identity | | | | | | | | Oct 5 |
| Contention resolution identity | | | | | | | | Oct 6 |
| Contention resolution identity | | | | | | | | Oct 7 |
| Contention resolution identity | | | | | | | | Oct 8 |
| Contention resolution identity | | | | | | | | Oct 9 |
| Contention resolution identity | | | | | | | | Oct 10 |

FIG. 15

RANDOM ACCESS METHOD AND COMMUNICATION APPARATUS

CROSS-REFERENCE TO RELATED APPLICATIONS

This application is a continuation of International Application No. PCT/CN2020/098394, filed on Jun. 28, 2020, which priority to Chinese Patent Application No. 201910573570.2, filed on Jun. 28, 2019. The disclosures of the aforementioned applications are hereby incorporated by reference in their entireties.

TECHNICAL FIELD

Embodiments of this application relates to the communication field, and more specifically, to a random access method and a communication apparatus.

BACKGROUND

In a wireless communication system, a terminal device needs to establish a connection to a network. This procedure is usually referred to as a random access (RA) procedure. Through random access, the terminal device may establish uplink synchronization with the network, and obtain a unique cell radio network temporary identifier (C-RNTI). An objective of the random access is to establish synchronization. The terminal device can perform uplink transmission only after obtaining the uplink synchronization. In addition, the random access further has a special purpose: If no dedicated scheduling request (SR) resource is configured or an SR fails on a physical uplink control channel (PUCCH), a scheduling resource may be applied for through the random access.

In a long term evolution (LTE) system and a 5th generation (5G) new radio (NR) system, the random access procedure includes two manners: contention and non-contention. A contention-based random access procedure usually includes the following steps: The terminal device randomly selects a random access preamble (RAP) from a random access preamble sequence set, and sends the selected RAP on a random access resource (for example, a physical random access channel (PRACH)) pre-specified by a network device; the terminal device receives, on a physical downlink shared channel (PDSCH), a random access response (RAR) message delivered by the network device; the terminal device sends, to a base station based on a C-RNTI included in the RAR message and on a physical uplink shared channel (PUSCH) specified in the RAR message, a message used for contention resolution; the terminal device needs to receive a contention resolution message from the base station, to complete the random access procedure.

To shorten a latency generated in the random access procedure, a two-step random access mechanism is currently being discussed in 5G NR. The two-step random access mechanism usually includes the following steps: The terminal device sends a RAP and data (a payload) to the base station; the base station sends a response message to the terminal device based on a decoding status of the RAP and/or the data. Currently, a format problem of the response message in the two-step random access mechanism is not clear yet. Consequently, the two-step random access mechanism is incomplete, and network communication reliability cannot be ensured.

SUMMARY

This application provides a random access method and a communication apparatus, so that a response message can be more flexible and efficient, and different usage requirements can be satisfied.

According to a first aspect, a random access method is provided. The method may be performed by a terminal device, or may be performed by a chip or a circuit configured in the terminal device. This is not limited in this application.

Specifically, the method includes: receiving, by the terminal device, a response message from a network device; determining, by the terminal device, a message format of the response message, where the message format includes a first format or a second format; and parsing, by the terminal device, the response message based on the determined message format of the response message, where the response message in the first format includes a contention resolution identity and a control plane message; and the response message in the second format includes a contention resolution identity and includes no control plane message.

For example, the first format may also be referred to as Format 1B, and the second format may also be referred to as Format 1A. Alternatively, the first format may also be referred to as Format 1A, and the second format may also be referred to as Format 1B. A specific name of the first format or the second format is not limited in this application.

The response message in this application is a response message for requesting random access, and may also be referred to as a random access response (message).

In this application, the response message in the first format includes the contention resolution identity and the control plane message. The response message in the second format includes the contention resolution identity but includes no control plane message (the control plane message may be sent in a subsequent message). The network device may determine, based on a specific case, a message format to be selected to send the response message. For example, to enable the terminal device to receive the control plane message as soon as possible, the network device may send the response message to the terminal device by using the first format. For another example, to multiplex response messages of as many terminal devices as possible together (in this case, a quantity of bits occupied by one terminal device should not be excessively large) and to improve radio resource utilization, the network device may send the response message to the terminal device by using the second format. After receiving the response message, the terminal device may first determine the message format, and then parse the response message based on the corresponding format.

According to the random access method provided in this embodiment of this application, two message formats of the response message are also provided. In addition, the network device can select, based on a specific case, either message format to send the response message to the terminal device, so that the response message is more flexible and efficient, and different usage requirements can be satisfied.

It should be understood that the response message in the first format or the response message in the second format may further include other content. This is not limited in this application.

Optionally, the response message in the first format or the response message in the second format further includes at least one of the following information: a timing advance command, a temporary cell radio network temporary identifier (C-RNTI), and an uplink grant.

The control plane message may alternatively be considered as an acknowledgement that is based on scheduled transmission. Optionally, the control plane message includes any one of the following messages: a radio resource control (RRC) connection setup message in an initial access scenario, an RRC resume message in an inactive state transition scenario, and an RRC reestablishment message in an RRC connection reestablishment scenario.

Optionally, in an alternative manner, the response message in the second format not only includes a contention resolution identity, but also includes at least one of the following information corresponding to each of N terminal devices: a timing advance command, a temporary cell radio network temporary identifier (C-RNTI), an uplink grant, and the like. This is not limited in this application. Alternatively, the response message in the second format may include no contention resolution identity, but includes at least one of the following information corresponding to each of N terminal devices: a timing advance command, a temporary cell radio network temporary identifier (C-RNTI), an uplink grant, and the like. This is not limited in this application.

With reference to the first aspect, in some implementations of the first aspect, the response message in the first format or the response message in the second format is carried in a medium access control (MAC) protocol data unit (PDU).

With reference to the first aspect, in some implementations of the first aspect, the MAC PDU includes a first MAC subPDU and a second MAC subPDU, the contention resolution identity in the response message in the first format is carried in the first MAC subPDU, and the control plane message in the response message in the first format is carried in the second MAC subPDU.

It should be understood that the contention resolution identity in the first MAC subPDU and the control plane message in the second MAC subPDU belong to a same terminal device.

Optionally, both the contention resolution identity and the control plane message in the response message in the first format may alternatively be carried in a same MAC subPDU.

Optionally, the contention resolution identity and the control plane message in the response message in the first format may alternatively be carried in three or more MAC subPDUs. This is not limited in this application.

Optionally, the response message in the first format may further include other content such as a timing advance command, a temporary C-RNTI, and an uplink grant. The foregoing other content and the contention resolution identity may be carried in a same MAC subPDU.

With reference to the first aspect, in some implementations of the first aspect, the response message in the second format includes N contention resolution identities corresponding to N terminal devices, the N contention resolution identities are carried in the MAC PDU, and N is an integer greater than or equal to 2. In this way, response messages of a plurality of terminal devices can be multiplexed together, to improve radio resource utilization.

With reference to the first aspect, in some implementations of the first aspect, the MAC PDU includes S MAC subPDUs, S is greater than or equal to N, and the N contention resolution identities are respectively carried in N MAC subPDUs. In this way, the response messages of the plurality of terminal devices can be multiplexed into a same MAC PDU, to improve radio resource utilization.

Optionally, the MAC PDU includes no control plane message corresponding to any one of the N terminal devices, so that response messages of more terminal devices can be multiplexed into the MAC PDU, or a size of the MAC PDU cannot be excessively large.

Optionally, the N contention resolution identities may alternatively be carried in more than or less than N MAC subPDUs. For example, a plurality of contention resolution identities may be multiplexed into one MAC subPDU, or one contention resolution identity is carried in one or more MAC subPDUs. This is not limited in this application.

Similarly, a response message of each terminal device may further include other content such as a timing advance command, a temporary C-RNTI, and an uplink grant. Therefore, the foregoing other content corresponding to the terminal device and a contention resolution identity of the response message may be carried in a same MAC subPDU.

With reference to the first aspect, in some implementations of the first aspect, the method further includes: receiving, by the terminal device, indication information from the network device, where the indication information is used to indicate the message format of the response message.

Optionally, the indication information may be carried in the MAC PDU, or the indication information may be carried in DCI corresponding to the response message.

Optionally, the indication information may be carried in a MAC subPDU in the MAC PDU or in a MAC subheader.

Optionally, the indication information may be carried in a reserved bit field in a MAC subheader. For example, whether a bit of the reserved bit field is 0 or 1 may indicate whether the message format of the response message is the first format or the second format.

Optionally, the indication information may alternatively be carried in a type indication field in a MAC subPDU, and the type indication field indicates whether the MAC subPDU has a fixed length or a variable length, to indirectly indicate whether the message format of the response message is the first format or the second format.

Optionally, the indication information may alternatively be carried in a MAC subPDU. For example, the MAC subPDU may be a dedicated MAC subPDU, and is specially configured to carry the indication information.

With reference to the first aspect, in some implementations of the first aspect, the receiving, by a terminal device, a response message from a network device includes: receiving, by the terminal device, the response message by using a first radio network temporary identifier (RNTI) and a second RNTI; and the determining, by the terminal device, a message format of the response message includes: determining, by the terminal device, the message format of the response message based on a receiving status of the response message.

Specifically, the terminal device receives the response message by using both the first RNTI and the second RNTI, and determines the message format of the response message based on the receiving status of the response message.

For example, if successfully receiving the response message by using the first RNTI, the terminal device may determine that the response message is the response message in the first format, that is, the message format is the first format.

For another example, if successfully receiving the response message by using the second RNTI, the terminal device may determine that the response message is the response message in the second format, that is, the message format is the second format.

With reference to the first aspect, in some implementations of the first aspect, the receiving, by a terminal device, a response message from a network device includes: monitoring, by the terminal device on a first resource set and a second resource set, DCI corresponding to the response message; and the determining, by the terminal device, a message format of the response message includes: determining, by the terminal device, the message format of the response message based on a monitoring status of the DCI corresponding to the response message.

Specifically, the terminal device monitors, on both the first resource set and the second resource set, the DCI corresponding to the response message, and determines the message format of the response message based on the monitoring status of the DCI corresponding to the response message.

For example, if successfully obtaining, through monitoring on the first resource set, the DCI corresponding to the response message, the terminal device may determine that the response message is the response message in the first format, that is, the message format is the first format.

For another example, if successfully obtaining, through monitoring on the second resource set, the DCI corresponding to the response message, the terminal device may determine that the response message is the response message in the second format, that is, the message format is the second format.

With reference to the first aspect, in some implementations of the first aspect, the first resource set includes a control channel resource set and/or searching space, and the second resource set includes a control channel resource set and/or searching space.

According to a second aspect, a random access method is provided. The method may be performed by a network device, or may be performed by a chip or a circuit configured in the network device. This is not limited in this application.

Specifically, the method includes: determining, by the network device, a message format of a response message, where the message format includes a first format or a second format; and sending, by the network device, the response message to a terminal device by using the determined message format, where the response message in the first format includes a contention resolution identity and a control plane message; and the response message in the second format includes a contention resolution identity and includes no control plane message.

In this application, the response message in the first format includes the contention resolution identity and the control plane message. The response message in the second format includes the contention resolution identity but includes no control plane message (the control plane message may be sent in a subsequent message). The network device may determine, based on a specific case, a message format to be selected to send the response message. For example, to enable a terminal device to receive the control plane message as soon as possible, the network device may send the response message to the terminal device by using the first format. For another example, to multiplex response messages of as many terminal devices as possible together (in this case, a quantity of bits occupied by one terminal device should not be excessively large) and to improve radio resource utilization, the network device may send the response message to the terminal device by using the second format.

According to the random access method provided in this embodiment of this application, two message formats of the response message are also provided. In addition, the network device can select, based on a specific case, either message format to send the response message to the terminal device, so that the response message is more flexible and efficient, and different usage requirements can be satisfied.

It should be understood that the response message in the first format or the response message in the second format may further include other content. This is not limited in this application.

Optionally, the response message in the first format or the response message in the second format further includes at least one of the following information: a timing advance command, a temporary cell radio network temporary identifier (C-RNTI), and an uplink grant.

The control plane message may alternatively be considered as an acknowledgement that is based on scheduled transmission. Optionally, the control plane message includes any one of the following information: a radio resource control (RRC) connection setup message in an initial access scenario, an RRC resume message in an inactive state transition scenario, and an RRC reestablishment message in an RRC connection reestablishment scenario.

Optionally, in an alternative manner, the response message in the second format not only includes a contention resolution identity, but also includes at least one of the following information corresponding to each of N terminal devices: a timing advance command, a temporary cell radio network temporary identifier (C-RNTI), an uplink grant, and the like. This is not limited in this application. Alternatively, the response message in the second format may include no contention resolution identity, but includes at least one of the following information corresponding to each of N terminal devices: a timing advance command, a temporary cell radio network temporary identifier (C-RNTI), an uplink grant, and the like. This is not limited in this application.

With reference to the second aspect, in some implementations of the second aspect, the response message in the first format or the response message in the second format is carried in a medium access control (MAC) protocol data unit (PDU).

With reference to the second aspect, in some implementations of the second aspect, the MAC PDU includes a first MAC subPDU and a second MAC subPDU, the contention resolution identity in the response message in the first format is carried in the first MAC subPDU, and the control plane message in the response message in the first format is carried in the second MAC subPDU.

Optionally, both the contention resolution identity and the control plane message in the response message in the first format may alternatively be carried in a same MAC subPDU.

Optionally, the contention resolution identity and the control plane message in the response message in the first format may alternatively be carried in three or more MAC subPDUs. This is not limited in this application.

Optionally, the response message in the first format may further include other content such as a timing advance command, a temporary C-RNTI, and an uplink grant. The foregoing other content and the contention resolution identity may be carried in a same MAC subPDU.

With reference to the second aspect, in some implementations of the second aspect, the response message in the second format includes N contention resolution identities corresponding to N terminal devices, the N contention resolution identities are carried in the MAC PDU, and N is an integer greater than or equal to 2. In this way, response messages of a plurality of terminal devices can be multiplexed together, to improve radio resource utilization.

With reference to the second aspect, in some implementations of the second aspect, the MAC PDU includes S MAC subPDUs, S is greater than or equal to N, and the N contention resolution identities are respectively carried in N MAC subPDUs. In this way, the response messages of the plurality of terminal devices can be multiplexed into a same MAC PDU, to improve radio resource utilization.

Optionally, the MAC PDU includes no control plane message corresponding to any one of the N terminal devices, so that response messages of more terminal devices can be multiplexed into the MAC PDU, or a size of the MAC PDU cannot be excessively large.

Optionally, the N contention resolution identities may alternatively be carried in more than or less than N MAC subPDUs. For example, a plurality of contention resolution identities may be multiplexed into one MAC subPDU, or one contention resolution identity is carried in one or more MAC subPDUs. This is not limited in this application.

Similarly, a response message of each terminal device may further include other content such as a timing advance command, a temporary C-RNTI, and an uplink grant. Therefore, the foregoing other content corresponding to the terminal device and a contention resolution identity of the response message may be carried in a same MAC subPDU.

With reference to the second aspect, in some implementations of the second aspect, the method further includes: sending, by the network device, indication information to the terminal device, where the indication information is used to indicate the message format of the response message.

Optionally, the indication information may be carried in the MAC PDU, or the indication information may be carried in DCI corresponding to the response message.

Optionally, the indication information may be carried in a MAC subPDU in the MAC PDU or in a MAC subheader.

Optionally, the indication information may be carried in a reserved bit field in a MAC subheader. For example, whether a bit of the reserved bit field is 0 or 1 may indicate whether the message format of the response message is the first format or the second format.

Optionally, the indication information may alternatively be carried in a type indication field in a MAC subPDU, and the type indication field indicates whether the MAC subPDU has a fixed length or a variable length, to indirectly indicate whether the message format of the response message is the first format or the second format.

Optionally, the indication information may alternatively be carried in a MAC subPDU. For example, the MAC subPDU may be a dedicated MAC subPDU, and is specially configured to carry the indication information.

With reference to the second aspect, in some implementations of the second aspect, the sending, by the network device, the response message to a terminal device by using the determined message format of the response message includes: when the message format of the response message determined by the network device is the first format, sending, by the network device, the response message in the first format by using a first radio network temporary identifier (RNTI); or when the message format of the response message determined by the network device is the second format, sending, by the network device, the response message in the second format by using a second RNTI.

With reference to the second aspect, in some implementations of the second aspect, the sending, by the network device, the response message to a terminal device by using the determined message format of the response message includes: when the message format of the response message determined by the network device is the first format, sending, by the network device on a first resource set, downlink control information (DCI) corresponding to the response message in the first format; or when the message format of the response message determined by the network device is the second format, sending, by the network device on a second resource set, DCI corresponding to the response message in the second format.

Optionally, the first resource set includes a control channel resource set and/or searching space, and the second resource set includes a control channel resource set and/or searching space.

According to a third aspect, a communication apparatus is provided. The communication apparatus includes: a receiving unit, configured to receive a response message from a network device; a determining unit, configured to determine a message format of the response message, where the message format includes a first format or a second format, the response message in the first format includes a contention resolution identity and a control plane message, and the response message in the second format includes a contention resolution identity, and includes no control plane message; and a parsing unit, configured to parse the response message based on the determined message format of the response message.

With reference to the third aspect, in some implementations of the third aspect, the response message in the first format or the response message in the second format is carried in a medium access control (MAC) protocol data unit (PDU).

With reference to the third aspect, in some implementations of the third aspect, the MAC PDU includes a first MAC subPDU and a second MAC subPDU, the contention resolution identity in the response message in the first format is carried in the first MAC subPDU, and the control plane message in the response message in the first format is carried in the second MAC subPDU.

With reference to the third aspect, in some implementations of the third aspect, the response message in the second format includes N contention resolution identities corresponding to N terminal devices, the N contention resolution identities are carried in the MAC PDU, and N is an integer greater than or equal to 2.

With reference to the third aspect, in some implementations of the third aspect, the MAC PDU includes S MAC subPDUs, S is greater than or equal to N, and the N contention resolution identities are respectively carried in N MAC subPDUs.

With reference to the third aspect, in some implementations of the third aspect, the method further includes: receiving, by a terminal device, indication information from the network device, where the indication information is used to indicate the message format of the response message.

With reference to the third aspect, in some implementations of the third aspect, the receiving unit receives the response message by using a first radio network temporary identifier (RNTI) and a second RNTI. The determining unit determines the message format of the response message based on a receiving status of the response message.

With reference to the third aspect, in some implementations of the third aspect, the receiving unit monitors, on a first resource set and a second resource set, DCI corresponding to the response message. The determining unit determines the message format of the response message based on a monitoring status of the DCI corresponding to the response message.

With reference to the third aspect, in some implementations of the third aspect, the first resource set includes a control channel resource set and/or searching space, and the second resource set includes a control channel resource set and/or searching space.

With reference to the third aspect, in some implementations of the third aspect, the indication information is carried in the MAC PDU, or the indication information is carried in DCI corresponding to the response message.

With reference to the third aspect, in some implementations of the third aspect, the response message in the first format or the response message in the second format further includes at least one of the following information: a timing advance command, a temporary cell radio network temporary identifier (C-RNTI), and an uplink grant.

With reference to the third aspect, in some implementations of the third aspect, the control plane message includes any one of the following information: radio resource control (RRC) connection setup, RRC resume, and RRC reestablishment.

According to a fourth aspect, a communication apparatus is provided. The communication apparatus includes: a determining unit, configured to determine a message format of a response message, where the message format includes a first format or a second format, the response message in the first format includes a contention resolution identity and a control plane message, and the response message in the second format includes a contention resolution identity, and includes no control plane message; and a sending unit, configured to send the response message to a terminal device by using the determined message format of the response message.

With reference to the fourth aspect, in some implementations of the fourth aspect, the response message in the first format or the response message in the second format is carried in a medium access control (MAC) protocol data unit (PDU).

With reference to the fourth aspect, in some implementations of the fourth aspect, the MAC PDU includes a first MAC subPDU and a second MAC subPDU, the contention resolution identity in the response message in the first format is carried in the first MAC subPDU, and the control plane message in the response message in the first format is carried in the second MAC subPDU.

With reference to the fourth aspect, in some implementations of the fourth aspect, the response message in the second format includes N contention resolution identities corresponding to N terminal devices, the N contention resolution identities are carried in the MAC PDU, and N is an integer greater than or equal to 2.

With reference to the fourth aspect, in some implementations of the fourth aspect, the MAC PDU includes S MAC subPDUs, S is greater than or equal to N, and the N contention resolution identities are respectively carried in N MAC subPDUs.

With reference to the fourth aspect, in some implementations of the fourth aspect, the sending unit is further configured to send indication information to the terminal device, where the indication information is used to indicate the message format of the response message.

With reference to the fourth aspect, in some implementations of the fourth aspect, when the message format of the response message determined by the determining unit is the first format, the sending unit sends the response message in the first format by using a first radio network temporary identifier (RNTI); or when the message format of the response message determined by the determining unit is the second format, the sending unit sends the response message in the second format by using a second RNTI.

With reference to the fourth aspect, in some implementations of the fourth aspect, when the message format of the response message determined by the determining unit is the first format, the sending unit sends, on a first resource set, downlink control information (DCI) corresponding to the response message in the first format; or when the message format of the response message determined by the determining unit is the second format, the sending unit sends, on a second resource set, DCI corresponding to the response message in the second format.

With reference to the fourth aspect, in some implementations of the fourth aspect, the first resource set includes a control channel resource set and/or searching space, and the second resource set includes a control channel resource set and/or searching space.

With reference to the fourth aspect, in some implementations of the fourth aspect, the indication information is carried in the MAC PDU, or the indication information is carried in DCI corresponding to the response message.

With reference to the fourth aspect, in some implementations of the fourth aspect, the response message in the first format or the response message in the second format further includes at least one of the following information: a timing advance command, a temporary cell radio network temporary identifier (C-RNTI), and an uplink grant.

With reference to the fourth aspect, in some implementations of the fourth aspect, the control plane message includes any one of the following messages: radio resource control (RRC) connection setup, RRC resume, and RRC reestablishment.

According to a fifth aspect, a communication apparatus is provided. The apparatus may be a terminal device, or may be a chip in the terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs the method in the first aspect. When the apparatus is the chip in the terminal device, the processing unit may be a processor, and the transceiver unit may be an input/output interface, a pin, a circuit, or the like. The processing unit executes instructions stored in a storage unit, so that the terminal device performs the method in the first aspect. The storage unit may be a storage unit (for example, a register or a cache) in the chip, or may be a storage unit (for example, a read-only memory or a random access memory) that is in the terminal device and that is outside the chip.

According to a sixth aspect, a communication apparatus is provided. The apparatus may be a network device, or may be a chip in the network device. The apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs the method in the second aspect. When the apparatus is a chip in the network device, the processing unit may be a processor, and the transceiver unit may be an input/output interface, a pin, a circuit, or the like. The processing unit executes instructions stored in a storage unit, so that the network device performs the method in the second aspect. The storage unit may be a storage unit (for example, a register or a cache) in the chip, or may be a storage unit (for example, a read-only memory or a random access memory) that is in the network device and that is outside the chip.

According to a seventh aspect, a communication apparatus is provided, and includes at least one processor. The at least one processor is configured to be coupled to a memory, and read and execute instructions in the memory, to implement any method in the first aspect or the second aspect.

According to an eighth aspect, a computer program product is provided. The computer program product includes computer program code. When the computer program code is run on a computer, the computer is enabled to perform the method in the foregoing first aspect or second aspect.

It should be noted that the foregoing computer program code may be completely or partially stored in a first storage medium, where the first storage medium may be packaged with a processor or packaged separately from the processor. This is not specifically limited in this application.

According to a ninth aspect, a computer-readable medium is provided. The computer-readable medium stores program code. When the computer program code is run on a computer, the computer is enabled to perform the method in the foregoing first aspect or second aspect.

BRIEF DESCRIPTION OF DRAWINGS

FIG. 11 is a schematic diagram of another example of a first MAC subPDU;

FIG. 14 is a schematic diagram of still another example of a first MAC subPDU;

FIG. 15 is a schematic diagram of still another example of a first MAC subPDU;

DESCRIPTION OF EMBODIMENTS

The following describes technical solutions in this application with reference to accompanying drawings.

The technical solutions in embodiments of this application may be applied to various communication systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) communication system, or a new radio (NR) access technology.

Figure 1:
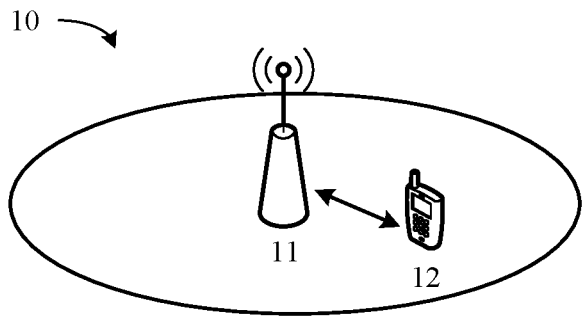
FIG. 1 is a schematic diagram of a communication system to which an embodiment of this application is applicable.

For ease of understanding the embodiments of this application, a communication system to which the embodiments of this application are applicable is first described in detail with reference to FIG. 1. FIG. 1 is a schematic diagram of a communication system to which an embodiment of this application is applicable. As shown in FIG. 1, the communication system 10 may include at least one network device such as a network device 11 shown in FIG. 1; the communication system 10 may further include at least one terminal device such as a terminal device 12 shown in FIG. 1. The network device 11 and the terminal device 12 may communicate with each other through a radio link. A plurality of antennas may be configured for each communication device such as the network device 11 or the terminal device 12. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device 11 and the terminal device 12 may communicate with each other by using a multiple-antenna technology.

It should be understood that the network device in the wireless communication system may be any device that has a wireless transceiver function. The device includes but is not limited to an evolved NodeB (eNB or eNodeB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system or one antenna panel or a group (including a plurality of antenna panels) of antenna panels of a base station in the 5G system, or may be a network node, for example, a baseband unit (BBU) or a distributed unit (DU), that constitutes a gNB or a transmission point.

In some deployments, the gNB may include a centralized unit (CU) and the DU. The gNB may further include a radio frequency unit. The CU implements some functions of the gNB, and the DU implements some functions of the gNB. For example, the CU implements functions of a radio resource control (RRC) layer and a packet data convergence protocol (PDCP) layer; the DU implements functions of a radio link control (RLC) layer, a medium access control (MAC) layer, and a physical (PHY) layer. Information at the RRC layer eventually becomes information at the PHY layer or is transformed from the information at the PHY layer. Therefore, in this architecture, it may also be considered that higher layer signaling such as RRC layer signaling is from the DU or is from the DU and the CU. It may be understood that the network device may be a CU node, a DU node, or a device including the CU node and the DU node. In addition, the CU may be classified into a network device in a radio access network (RAN), or the CU may be classified into a network device in a core network (CN). This is not limited in this application.

It should be further understood that, the terminal device in the wireless communication system may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application.

To facilitate understanding of the embodiments of this application, related technical content in this application is briefly described first.

1. Four-Step Random Access

In the LTE system and the 5G NR system, a random access procedure usually needs to be performed in the following cases: A terminal device performs initial access, and transits from an idle state to a connected state; an RRC connection is reestablished after a radio connection is interrupted; during handover, the terminal device needs to establish uplink synchronization with a target cell; when the terminal device is in the connected state but the terminal device is out of uplink synchronization, uplink or downlink data arrives, and uplink synchronization needs to be established through random access; user positioning is performed based on uplink measurement; when no dedicated scheduling request resource is allocated to a PUCCH, an uplink resource is applied for through random access.

As the 5G NR system is further discussed, new scenarios may be introduced into random access. For example, downlink data (DL data) arrives in an inactive state, and an uplink is in an out-of-synchronization state in this case; uplink data (UL data) arrives in the inactive state, and the uplink is in the out-of-synchronization state in this case; inactive state transition is performed; the terminal device requests on-demand (On-demand) system information (SI); the terminal device sends a beam failure recovery request; the terminal device requests a system information (request for other SI).

The inactive state is a state newly introduced in 5G. The state is between the connected state and the idle state. In the inactive state, there is no RRC connection between the terminal device and an access network device, but a connection between the access network device and a core network device is maintained, and the terminal device stores all or some information required for setting up/resuming a connection. Therefore, in the inactive state, when the terminal device needs to establish the connection, the terminal device may quickly set up/resume the RRC connection to the access network device based on the stored related information.

Figure 2:
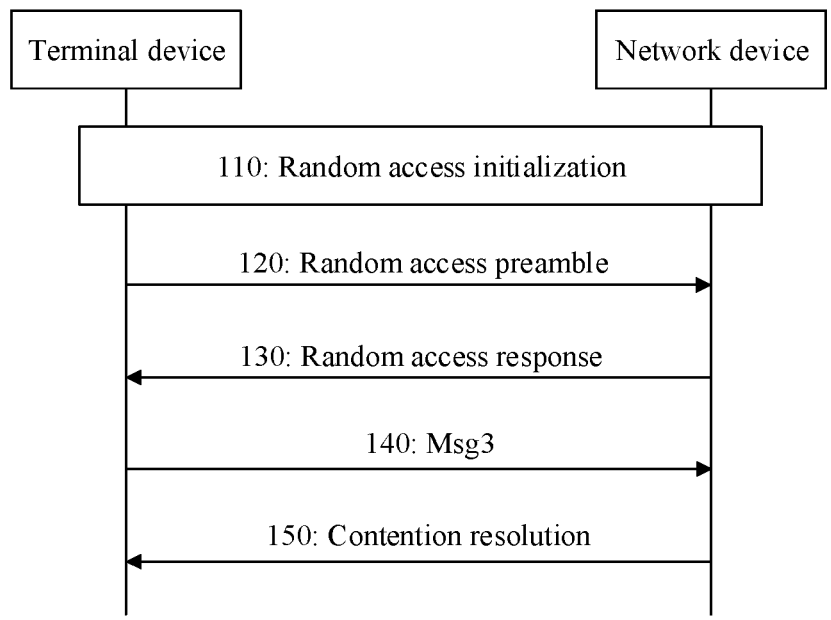
FIG. 2 is a flowchart of contention random access in an LTE system and a 5G NR system.

FIG. 2 is a flowchart of contention random access in an LTE system and a 5G NR system.

110: Random access initialization.

A random access procedure is triggered by a PDCCH order, a MAC sublayer, or an RRC sublayer. If a terminal device receives PDCCH transmission that is scrambled by using a C-RNTI and consistent with the PDCCH order, the random access procedure is triggered. The PDCCH order or an RRC message can indicate preamble indexes RA-Preamble Index (there are a total of 64 types) and physical layer random access channel indexes RA-PRACH-Mask Index (there are a total of 16 types) used during resource selection in the random access procedure.

The preamble index is used to indicate a preamble for random access. When a value of the preamble index is 000000, it indicates that the random access is initiated by the MAC sublayer, that is, the preamble is selected by the MAC sublayer, and correspondingly, contention random access is performed. When the value of the preamble index is not 000000, UE performs random access by using the preamble indicated by the preamble index, that is, performs contention-free random access. The physical layer physical access channel index RA-PRACH-Mask Index is used to indicate that the terminal device may send the preamble on a PRACH corresponding to which subframe in a system frame. The terminal device may look up in a corresponding table by using the RA-PRACH-Mask Index, to determine the preamble and an available physical resource.

Parameters need to be configured for random access initialization, and the parameters include: a PRACH resource set (for example, PRACH-Config Index) that may be used to transmit a random access preamble; an available group of random access preambles (a group A or a group B) and an available preamble set in each group; a maximum quantity of times of preamble transmission (preamble TransMax); a preamble initial transmit power (preamble Initial Received Target power); a power ramping step; a random access response window (RA-Response window Size); a maximum quantity of times of HARQ retransmission of a third message (Msg3) (max HARQ-Msg3); and a contention resolution timer (mac-Contention Resolution Timer).

It should be noted that, before a random access procedure is triggered each time, all the foregoing configured parameters may be updated by using a higher-layer configuration. After obtaining the foregoing parameters, the terminal device performs the following operations: clearing a buffer of Msg3; setting a quantity of times of preamble sending (PREAMBLE_TRANSMISSION_COUNTER) to 1; and setting a backoff parameter value stored by the terminal device to 0 ms, and entering a random access resource selection phase.

It should be further noted that, the terminal device performs only one random access procedure at any moment. If the terminal device receives a newly initiated random access request in one random access procedure, implementation on a terminal device side determines to continue the ongoing random access procedure or start a new random access procedure.

120: The terminal device sends a random access preamble to a network device.

Specifically, the RAP is carried in a first message (Msg1). A main function of the RAP is to notify the network device that there is a random access request, and enable the network device to estimate a transmission latency between the network device and the terminal device, so that an access network device can calibrate an uplink advance (uplink timing) and notify the terminal device of calibration information by using a timing advance command.

As a new random access scenario is introduced into the 5G NR system, the random access may alternatively be used for another request of the terminal device in the new scenario. For example, the RAP may alternatively be used to indicate to send on-demand system information request, or be used to indicate to send a beam failure recovery request. This is not limited in this application.

For example, there may be a correspondence between the RAP and one or more on-demand SI requests, or there may be a correspondence between the RAP and one or more beam failure recovery requests. The terminal device may preconfigure the RAP, or receive the RAP configured by the access network device.

130: The terminal receives a random access response (RAR) from the network device.

Specifically, the terminal device may monitor a PDCCH by using a random access radio network temporary identifier (RA-RNTI). If receiving scheduling information, namely, downlink control information (DCI), that belongs to the terminal device, the terminal device receives, on a PDSCH based on the DCI, a RAR message delivered by the network device. The DCI includes related content such as resource block (RB) allocation information and a modulation and coding scheme (MCS).

Specifically, the random access response is carried in a second message (Msg2). After sending the preamble, the terminal device monitors the corresponding PDCCH in a RAR response window based on an RA-RNTI value corresponding to the preamble. If a preamble carried in the response received by the terminal device is consistent with the preamble from using Msg1, the terminal device stops monitoring the RAR. Specifically, the network device may send the RAR to the terminal device by using the PDSCH.

The RAR includes an uplink timing advance, an uplink grant (UL grant) allocated to the third message (Msg3), a temporary cell radio network temporary identifier (temporary cell radio network temporary identifier, temporary C-RNTI) allocated by a network side, and the like. The PDCCH carrying a Msg2 scheduling message is scrambled by using the RA-RNTI.

It should be noted that, if a plurality of terminal devices send RAPs on a same PRACH resource (at a same time-frequency location), a plurality of corresponding RARs are multiplexed into a same medium access control (MAC) protocol data unit (PDU).

140: The terminal device sends a message (namely, Msg3) that is based on scheduled transmission to the network device.

The terminal device sends Msg3 to the network device by using a PUSCH based on an uplink grant and uplink timing advance information in Msg2. Herein, content of Msg3 may alternatively be different based on different states of the terminal device and different application scenarios.

Because the network device sends the MAC PDU to the plurality of terminal devices in 130, all terminal devices may receive different RARs. Correspondingly, behavior of all the terminal devices may also be different. After obtaining, through monitoring a RAR that belongs to each terminal device, the terminal device may send Msg3 to the access network device based on specific content included in the RAR.

Msg3 may be classified into the following types: an RRC connection request, a tracking area data update, a resource scheduling request, and the like. Some examples of Msg3 are provided in Table 1.

TABLE 1

| Random access reason | Message type | Identity of a terminal device |
|---|---|---|
| Initial network access | RRC connection request | NAS terminal device ID (S-TMSI) or random number |
| RRC connection reestablishment | RRC connection reestablishment request | C-RNTI |
| Handover | Handover message | C-RNTI |
| Downlink data arrival | C-RNTI MAC control element | C-RNTI |
| Uplink data arrival | C-RNTI MAC control element | C-RNTI |

150: The terminal device receives contention resolution message, namely, a fourth message Msg4, from the network device.

When a plurality of terminal devices initiate random access by using a same preamble, contention occurs. At most only one terminal device in the terminal devices that contend for a same resource can successfully access. In this case, the network device sends a contention resolution message to the terminal device by using the PDSCH.

Specifically, after sending Msg3, the terminal device starts the contention resolution timer (mac-Contention Resolution Timer), and monitors the PDCCH by using the temporary C-RNTI indicated in the RAR or a C-RNTI preconfigured by the network device. If the terminal device receives, before the contention resolution timer expires, the contention resolution message from the network device to the terminal device, it is considered that the random access procedure succeeds.

2. Two-Step Random Access

Figure 3:
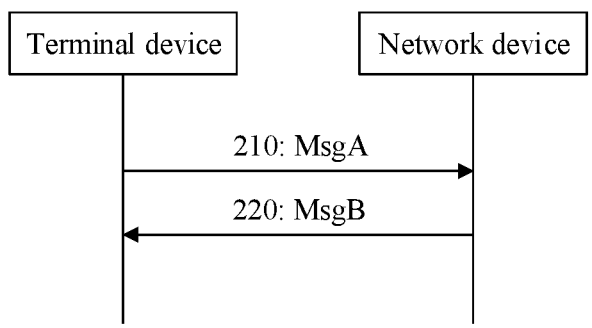
FIG. 3 is a flowchart of two-step random access in a 5G NR system.

For contention random access, to shorten a random access latency, the 5G NR system supports the two-step random access in addition to a currently conventional four-step random access method. The two-step random access is a research hotspot of random access in the current 5G NR system. FIG. 3 is a flowchart of the two-step random access in the 5G NR system.

210: A terminal device sends a message A (MsgA) to a network device.

Specifically, MsgA includes a random access signal and payload data. The random access signal may include a preamble and/or a demodulation reference signal (DMRS). The random access signal is used to receive the payload data. For example, a transmission boundary (for example, a start location and an end location of a slot for transmitting the payload data) or demodulation of the payload data may be determined based on the random access signal. The payload data may be control plane data and/or user plane data. The payload data may correspond to content included in Msg3 in the foregoing four-step random access mechanism. For example, the payload data may include any one of an RRC connection request, an identity of the terminal device, a scheduling request, a buffer status report (BSR), real service data, and the like.

Optionally, the identity of the terminal device may be a C-RNTI, a serving-temporary mobile subscriber identity (s-TMSI), an identifier (resumeIdentity) of the terminal in an inactive state, or the like. A specific identifier carried depends on different random access trigger events, and is not limited. It should be noted that the identity of the terminal device may be all carried in the payload data, or may be partially carried in the payload data, and partially carried in the random access signal. Being carried in the random access signal may be understood as that different sequences or a same sequence with different cyclic shifts represents different bit values. Table 2 provides identities of the terminal device that correspond to the different random access trigger events.

TABLE 2

| Random access trigger event | Type of a UE identity |
|---|---|
| Initial access | NAS terminal device ID (S-TMSI) or random number |
| RRC connection reestablishment | C-RNTI |
| Handover | C-RNTI |
| Uplink/downlink data arrival or uplink out-of-synchronization | C-RNTI |
| Inactive state transition | Short I-RNTI or I-RNTI |
| Request system information | None |
| Beam failure recovery | C-RNTI |

After receiving MsgA, the network device decodes the random access signal and the payload data, to obtain decoding states including: (1) "successfully decoded" and (2) "unsuccessfully decoded". Table 3 shows possible decoding results.

TABLE 3

| | Random access signal | Payload data |
|---|---|---|
| Case 1 | Unsuccessfully decoded | Unsuccessfully decoded |
| Case 2 | Unsuccessfully decoded | Successfully decoded |
| Case 3 | Successfully decoded | Unsuccessfully decoded |
| Case 4 | Successfully decoded | Successfully decoded |

Further, possible relationships between a resource on which the random access signal is located and a resource on which the payload data is located are as follows: (1) There is an overlapping area in time domain, and there is no overlapping area in frequency domain; (2) there is no overlapping area in time domain, and there may be or may not be an overlapping area in frequency domain. The resource on which the random access signal is located and the resource on which the payload data is located may be configured by the network device.

220: The network device sends a message B (MsgB) to the terminal device.

Specifically, MsgB is used to carry a response message for the random access signal and the payload data. The response message may include at least one of the following: information about a temporary C-RNTI, information about a timing advance command (TA command), information about an uplink grant, information about a contention resolution identity (contention resolution ID), and the like. The contention resolution identity may be some or all of content of the payload data.

In addition, the response message further includes a control plane message (which may also be considered as an acknowledgement that is based on scheduled transmission). For example, based on different states of the terminal device and different triggering scenarios, a RAR may further include one of the following: an RRC setup (RRCSetup) message, an RRC reestablishment (RRCReestablishment) message, an RRC resume (RRCResume) message, and the like.

The response message in this application is a response message for requesting random access, and may also be referred to as a random access response (message).

3. Medium Access Control Protocol Data Unit (MAC PDU)

Figure 4:
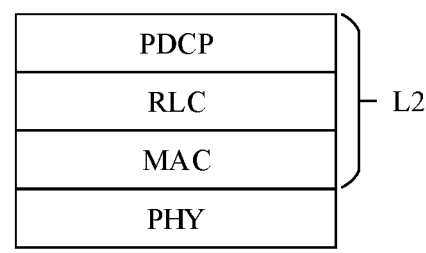
FIG. 4 is a schematic diagram of a structure of a layer 2 protocol stack.

A layer 2 (L2) protocol stack defined in an LTE protocol by the third generation partnership project (3rd generation partnership project, 3GPP) includes three logical layers from top to bottom: a PDCP layer, an RLC layer, and a MAC layer. A layer 2 (L2) protocol stack defined in an NR protocol by the 3GPP includes four logical layers from top to bottom: a service data adaptation protocol (SDAP) layer, a PDCP layer, an RLC layer, and a MAC layer. The SDAP layer completes mapping from a quality of service (QoS) flow to a radio bearer. The PDCP layer implements functions such as data transmission, encryption, integrity protection, and header compression in a user plane and a control plane. The RLC layer implements functions such as data packet size matching. The MAC layer implements functions such as data scheduling and mapping between a logical channel and a transport channel. A processing procedure of an entire L2 downlink protocol stack is as follows: A PDCP header is added to PDCP layer data, to form a PDCP protocol data unit, and the PDCP protocol data unit is sent to the RLC layer. After implementing a function, the RLC layer adds an RLC header to the received data and sends the data to the MAC layer. The MAC layer multiplexes one or more MAC service data units (SDUs), to form a MAC PDU, and sends the MAC PDU to a terminal device. FIG. 4 is a schematic diagram of a structure of a layer 2 protocol stack in LTE.

Figure 5:
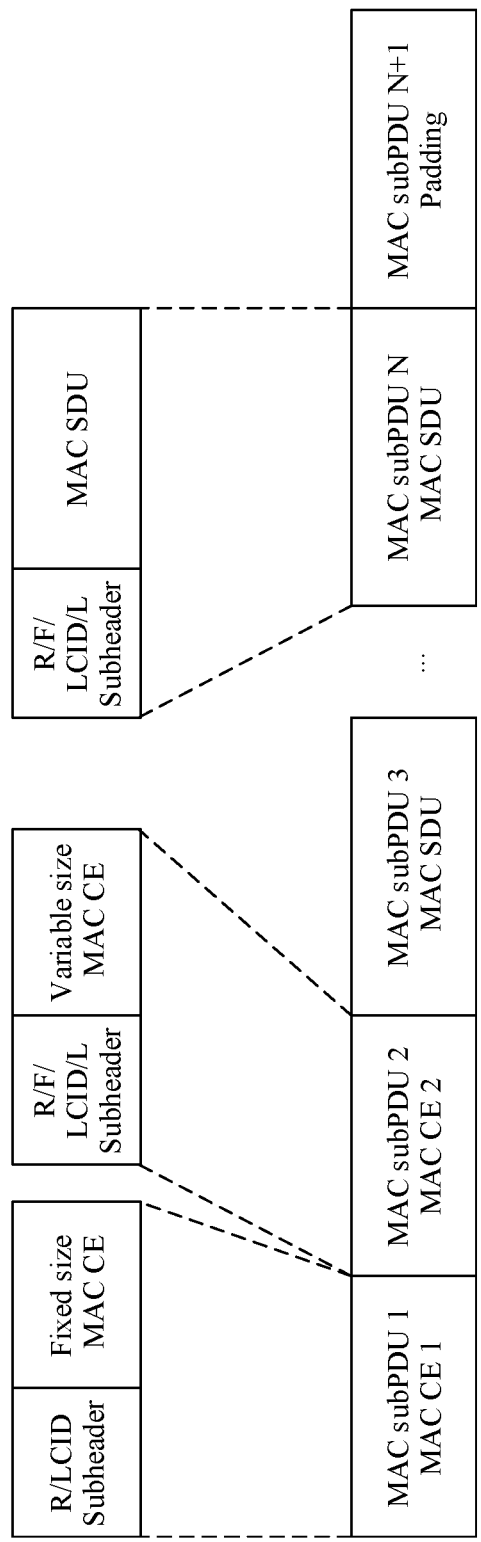
FIG. 5 is a schematic diagram of a structure of an example of a MAC PDU.

FIG. 5 is a schematic diagram of a structure of an example of a MAC PDU. As shown in FIG. 5, one MAC PDU may include a plurality of MAC subPDUs. The MAC subPDU may include any one of a MAC SDU, a MAC control element (media access control control element, MAC CE), and padding data. Padding data is data for padding. When a data amount at an RLC layer is less than an actually scheduled resource, MAC needs to pad at the end of the MAC PDU, that is, with padding data. Based on a specific case, the MAC PDU may include the padding data, or may not include the padding data.

The MAC subPDU may include a MAC subheader, or may not include the MAC subheader.

Figure 6:
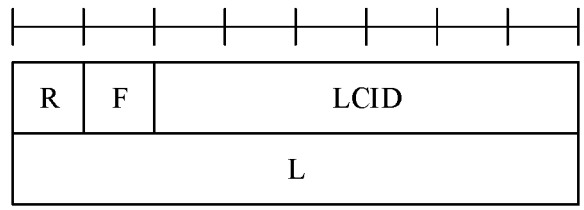
FIG. 6 is a schematic diagram of a structure of an example of a MAC subheader.

FIG. 6 is a schematic diagram of a structure of an example of a MAC subheader. The MAC subheader may correspond to subheaders of a MAC subPDU 2 and a MAC subPDU n in FIG. 5. In FIG. 6, the MAC subheader includes a reserved bit field R, and further includes a format field F, a logical channel identifier field LCID (logical channel ID field), and a length field L. The logical channel identifier field LCID usually occupies six bits. The format field F occupies one bit. The format field F is used to indicate a length of the length field L. For example, when a value of the format field F is 0, it indicates that the length of the length field L is eight bits; or when the value of the format field F is 1, it indicates that the length of the length field L is 16 bits. The length field L is used to indicate sizes of the MAC subPDUs in which the length field L is located.

It should be understood that the foregoing related descriptions of the four-step random access, the two-step random access, and the MAC PDU are merely for ease of understanding the technical solutions in this application, but constitute no limitation on this application.

Currently, a format problem of the response message in a two-step random access mechanism is not clear yet. Consequently, the two-step random access mechanism is incomplete, and network communication reliability cannot be ensured.

The embodiments of this application provide a random access method, and two message formats of a random access response are provided. A network device can select, based on a specific case, either message format to send the random access response to a terminal device, so that the random access response is more flexible and efficient, and different usage requirements can be satisfied.

The following describes the random access method provided in the embodiments of this application with reference to the accompanying drawings. In the embodiments, the network device may be the network device 11 in FIG. 1, and the terminal device may be the terminal device 12 in FIG. 1.

Figure 7:
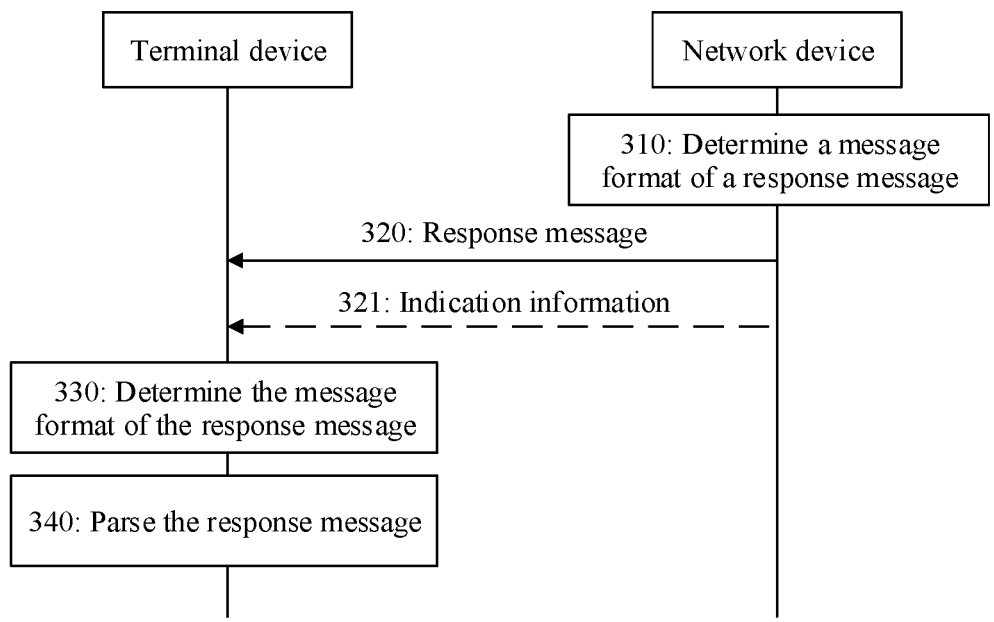
FIG. 7 is a schematic flowchart of an example of a random access method.

FIG. 7 is a schematic flowchart of a two-step random access method 300 according to this application. With reference to FIG. 7, the following describes the random access method 300 provided in this embodiment of this application. The method 300 includes the following steps.

Step 310: A network device determines a message format of a response message, where the message format includes a first format or a second format, where the response message in the first format includes a contention resolution identity and a control plane message; and the response message in the second format includes a contention resolution identity and includes no control plane message.

For example, the first format may also be referred to as Format 1B, and the second format may also be referred to as Format 1A. Alternatively, the first format may also be referred to as Format 1A, and the second format may also be referred to as Format 1B. A specific name of the first format or the second format is not limited in this application. Step 320: The network device sends the response message to a terminal device by using the determined message format.

Correspondingly, in step 320, the terminal device receives the response message from the network device.

Specifically, the network device first receives a random access request message (corresponding to the message A (MsgA) in the foregoing two-step random access) from the terminal device. The random access request message includes a random access signal and payload data. The random access signal may be a preamble and/or a DMRS. Content included in the payload data may be different in different random access triggering scenarios. For example, the payload data may include any part of an RRC connection request, an identity of the terminal device, a scheduling request, a buffer status report, real service data, and the like.

In this embodiment, the random access triggering scenario may be any one of initial access, RRC connection reestablishment, inactive state transition, system information request, and the like.

Optionally, the payload data may include any one of an RRC connection setup request message in the initial access scenario, an RRC reestablishment request message in the RRC connection reestablishment scenario, an RRC resume request message in the inactive state transition scenario, and the like.

Further, after receiving the random access request message, the network device needs to decode the random access signal and the payload data that are included in the random access request message. In this embodiment, results of decoding the random access signal and the payload data by the network device may be the case 2 and the case 4 in the foregoing Table 3. That is, the network device should successfully decode the payload data, and the result of decoding the random access signal may not be required.

After receiving the random access request message and successfully decoding the payload data, the network device may generate corresponding response information based on content in the payload data. In this embodiment, the response information may include a contention resolution identity, and optionally may further include a control plane message. The network device sends the response message to the terminal device by using the first format or the second format.

The contention resolution identity may be some content or all content in the payload data. For example, the contention resolution identity may be a part of a continuous character string in a message that is based on scheduled transmission. This is not limited in this application.

After receiving and parsing the response message, the terminal device matches the contention resolution identity with corresponding content in the sent payload data. If the contention resolution identity is successfully matched with the corresponding content in the sent payload data (for example, the contention resolution identity and the corresponding content in the sent payload data are the same), the terminal device may determine that the response message is a response belonging to the terminal device. In this case, the terminal device may stop monitoring the response message.

Optionally, in different random access triggering scenarios, the control plane message may include any one of the following messages: RRC connection setup in the initial access scenario, RRC reestablishment in the RRC connection reestablishment scenario, and RRC resume in the inactive state transition scenario.

The response message in the first format includes the contention resolution identity and the control plane message. The response message in the second format includes the contention resolution identity but includes no control plane message (the control plane message may be sent in another message). The network device may determine, based on a specific case, a message format to be selected to send the response message. For example, to enable the terminal device to receive the control plane message as soon as possible, the network device may send the response message to the terminal device by using the first format. For another example, to multiplex response messages of as many terminal devices as possible together (in this case, a quantity of bits occupied by one terminal device should not be excessively large) and to improve radio resource utilization, the network device may send the response message to the terminal device by using the second format.

According to the random access method provided in this embodiment of this application, two message formats of a random access response are also provided. In addition, the network device can select, based on a specific case, either message format to send the random access response to the terminal device, so that the random access response is more flexible and efficient, and different usage requirements can be satisfied.

Optionally, in a possible implementation, in step 310, the network device may further determine, according to an indication of the terminal device, a message format to be selected to send the response message.

For example, the network device may determine, according to the indication of the terminal device, to use the first format or the second format to send the response message.

The terminal device may indicate the message format of the response message in an explicit or implicit manner, and the network device may determine a to-be-used message format according to the indication. The terminal device may indicate the message format of the response message in either of the following two manners.

Manner A

Before step 310, the method 300 further includes:

sending, by the terminal device, message format request information of the response message to the network device, where the message format request information is used to indicate a message format to be used by the network device to send the response message.

Correspondingly, the network device receives the message format request information from the terminal device, and determines, based on the message format request information, the message format to be used to send the response message.

Optionally, the message format request information may be carried in uplink control information (UCI).

Optionally, the message format request information may be carried in the random access request message (namely, the message A).

Manner B

It may be specified in a system or a protocol, or may be agreed on by the network device and the terminal device that the terminal device may send the random access request message according to the following rule:

when the terminal device determines that the requested message format of the response message is the first format, sending, by the terminal device, the random access request message on a first random access resource; and when the terminal device determines that the requested message format of the response message is the second format, sending, by the terminal device, the random access request message on a second random access resource.

Correspondingly, the network device may determine the message format of the response message based on a receiving status of the random access request message.

For example, if receiving the random access request message on the first random access resource, the network device may determine that a message format of the random access response is the first format.

For another example, if receiving the random access request message on the second random access resource, the network device may determine that a message format of the random access response is the second format.

The first random access resource and the second random access resource may be specified in the system or the protocol, or may be agreed on by the network device and the terminal device.

It should be understood that the "protocol" in this embodiment of this application may be a standard protocol in the communication field, for example, may include an LTE protocol, an NR protocol, and a related protocol applied to a future communication system. This is not limited in this application. Optionally, response messages in different message formats may correspond to different random access configurations (for example, response window lengths), and the terminal device may receive the response messages in the different message formats based on the different random access configurations.

Optionally, the terminal device may receive the response message in the first format based on a first random access configuration. For example, the terminal device may receive the response message in the first format within a first response window length.

Optionally, the terminal device may receive the response message in the second format based on a second random access configuration. For example, the terminal device may receive the response message in the second format within a second response window length.

Optionally, if the network device determines, according to the indication of the terminal device, the message format to be selected to send the response message, in step 320, the terminal device may select, based on content of the indication, a corresponding random access configuration to receive the response message.

For example, when the terminal device indicates that the message format of the response message to be selected by the network device is the first format, the terminal device may receive the response message in the first format based on the first random access configuration corresponding to the first format.

For another example, when the terminal device indicates that the message format of the response message to be selected by the network device is the second format, the terminal device may receive the response message in the second format based on the second random access configuration corresponding to the second format.

Optionally, the response message may further include at least one of a timing advance command, a temporary cell radio network temporary identifier (C-RNTI), and an uplink grant. In other words, the response message in the first format or the response message in the second format may further include the at least one of the timing advance command, the temporary C-RNTI, and the uplink grant. It should be noted that the uplink grant may be used to transmit a feedback (for example, a HARQ feedback) for response information, and may be a PUCCH resource or a PUSCH resource.

Optionally, the response message in the second format includes N contention resolution identities corresponding to N terminal devices, and N is an integer greater than or equal to 2, so that response messages of a plurality of terminal devices can be multiplexed together, to improve radio resource utilization.

Optionally, in an alternative manner, the response message in the second format may include no contention resolution identity, but includes at least one of the following information corresponding to each of N terminal devices: a timing advance command, a temporary cell radio network temporary identifier (C-RNTI), and an uplink grant. This is not limited in this application.

Optionally, the response message in the second format includes no control plane message corresponding to any one of the N terminal devices. For example, the response message in the second format includes only the contention resolution identities of the N terminals, but includes no control plane message. In this way, response messages of as many terminal devices as possible can be multiplexed together, to improve radio resource utilization. Alternatively, the response message in the second format not only includes the contention resolution identity, but also includes at least one of the following information corresponding to each of the N terminal devices: a timing advance command, a temporary cell radio network temporary identifier (C-RNTI), an uplink grant, and the like. This is not limited in this application. Optionally, the response message in the first format or the response message in the second format is carried in a medium access control (MAC) protocol data unit (PDU).

For example, for the response message in the first format, both the contention resolution identity and the control plane message may be carried in the MAC PDU; for the response message in the second format, the contention resolution identity may be carried in the MAC PDU.

Figure 8:
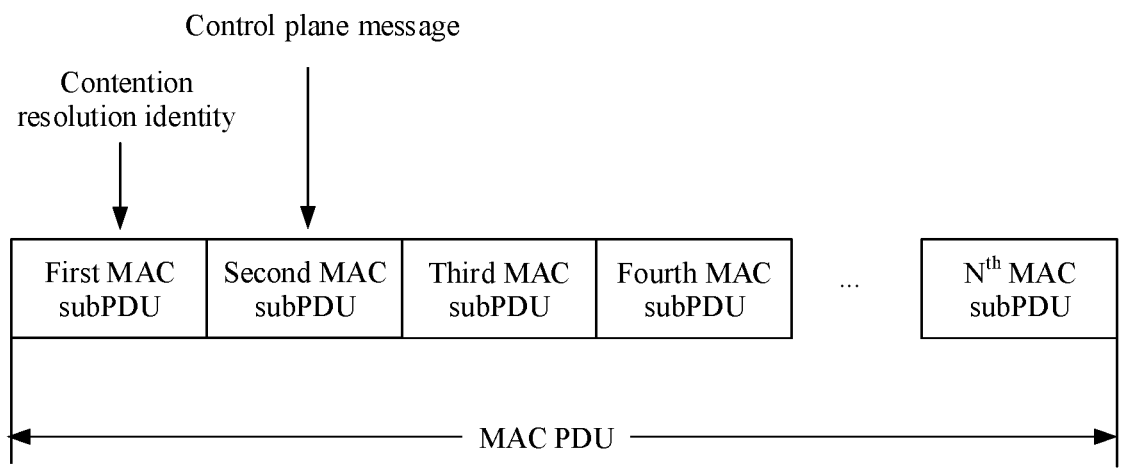
FIG. 8 is a schematic diagram of an example in which a response message in a first format is carried in a MAC PDU.

FIG. 8 is a schematic diagram of an example in which the response message in the first format is carried in the MAC PDU.

As shown in FIG. 8, the MAC PDU includes at least a first MAC subPDU and a second MAC subPDU, the contention resolution identity in the response message in the first format is carried in the first MAC subPDU, and the control plane message in the response message in the first format is carried in the second MAC subPDU.

Figure 9:
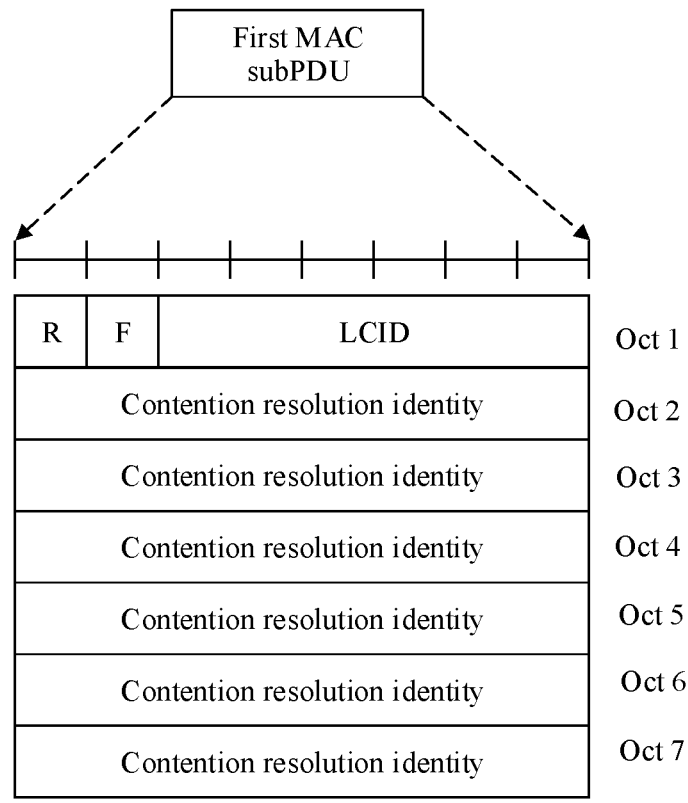
FIG. 9 is a schematic diagram of a structure in which a contention resolution identity is carried in a first MAC subPDU.
Figure 10:
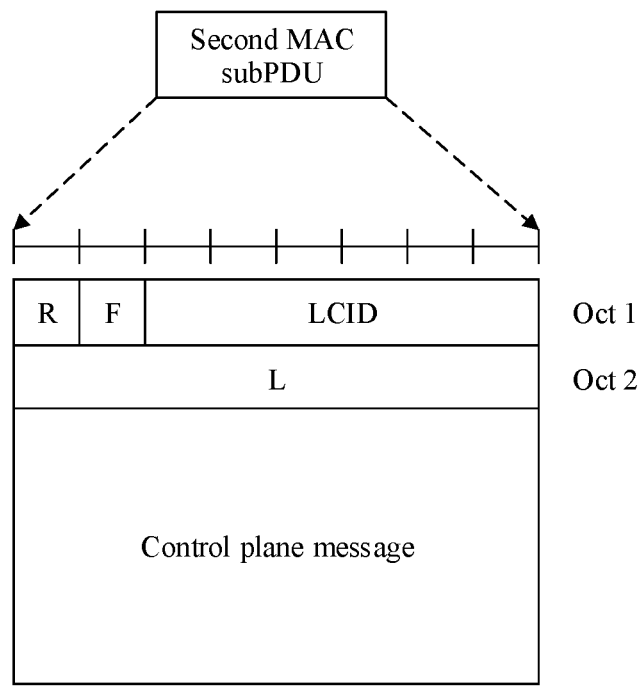
FIG. 10 is a schematic diagram of a structure in which a control plane message is carried in a second MAC subPDU.

FIG. 9 is a schematic diagram of a structure in which the contention resolution identity is carried in the first MAC subPDU, and FIG. 10 is a schematic diagram of a structure in which the control plane message is carried in the second MAC subPDU.

In FIG. 9, an octet 1 (corresponding to oct 1 shown in the figure) is used to carry a MAC subheader of the first MAC subPDU, and octets 2 to 7 (oct 2 to oct 7) are used to carry the contention resolution identity. In FIG. 10, an octet 1 (oct 1) and an octet 2 (oct 2) are used to carry a MAC subheader of the second MAC subPDU.

Optionally, other MAC subPDUs in FIG. 8 (for example, a third MAC subPDU and a fourth MAC subPDU) may carry other communication data of the terminal device. This is not limited in this application.

Optionally, both the contention resolution identity and the control plane message in the response message in the first format may alternatively be carried in a same MAC subPDU.

Optionally, the contention resolution identity and the control plane message in the response message in the first format may alternatively be carried in three or more MAC subPDUs. This is not limited in this application.

Referring to the foregoing descriptions, the response message in the first format may further include other content such as the timing advance command, the temporary C-RNTI, and the uplink grant. The foregoing other content and the contention resolution identity may be carried in a same MAC subPDU (namely, the first MAC subPDU). FIG. 11 to FIG. 15 each are a schematic diagram of a structure in which the first MAC subPDU further carries the foregoing other content.

FIG. 11 is a schematic diagram of another example of the first MAC subPDU. In FIG. 11, in addition to the contention resolution identity, the first MAC subPDU further carries the timing advance command, the uplink grant, and the temporary C-RNTI.

Figure 12:
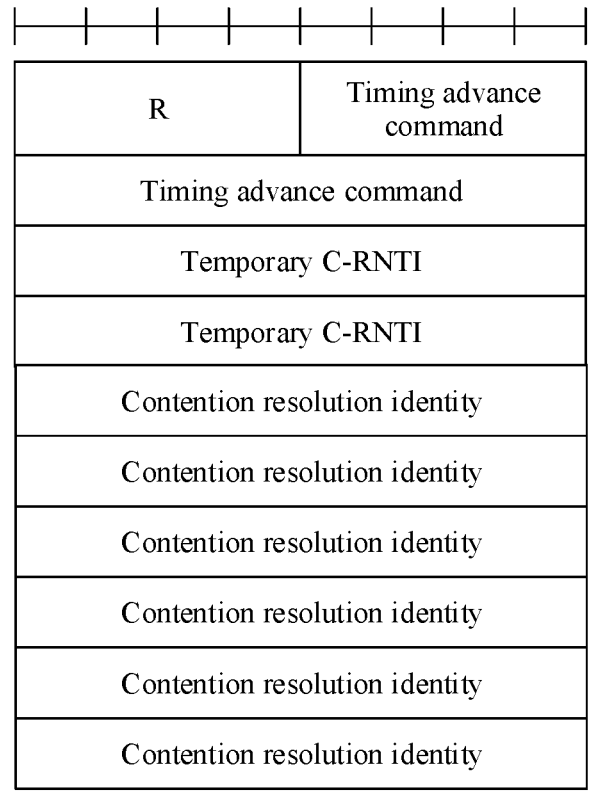
FIG. 12 is a schematic diagram of still another example of a first MAC subPDU.

FIG. 12 is a schematic diagram of still another example of the first MAC subPDU. In FIG. 12, in addition to the contention resolution identity, the first MAC subPDU further carries the timing advance command and the temporary C-RNTI.

Figure 13:
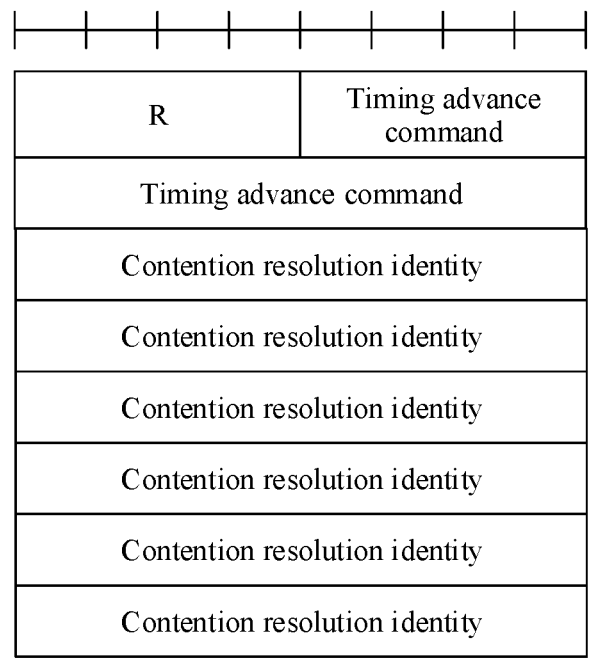
FIG. 13 is a schematic diagram of still another example of a first MAC subPDU.

FIG. 13 is a schematic diagram of still another example of the first MAC subPDU. In FIG. 13, in addition to the contention resolution identity, the first MAC subPDU further carries the timing advance command.

FIG. 14 is a schematic diagram of still another example of the first MAC subPDU. In FIG. 14, in addition to the contention resolution identity, the first MAC subPDU further carries the temporary C-RNTI.

FIG. 15 is a schematic diagram of still another example of the first MAC subPDU. In FIG. 15, in addition to the contention resolution identity, the first MAC subPDU further carries the uplink grant.

Figure 16:
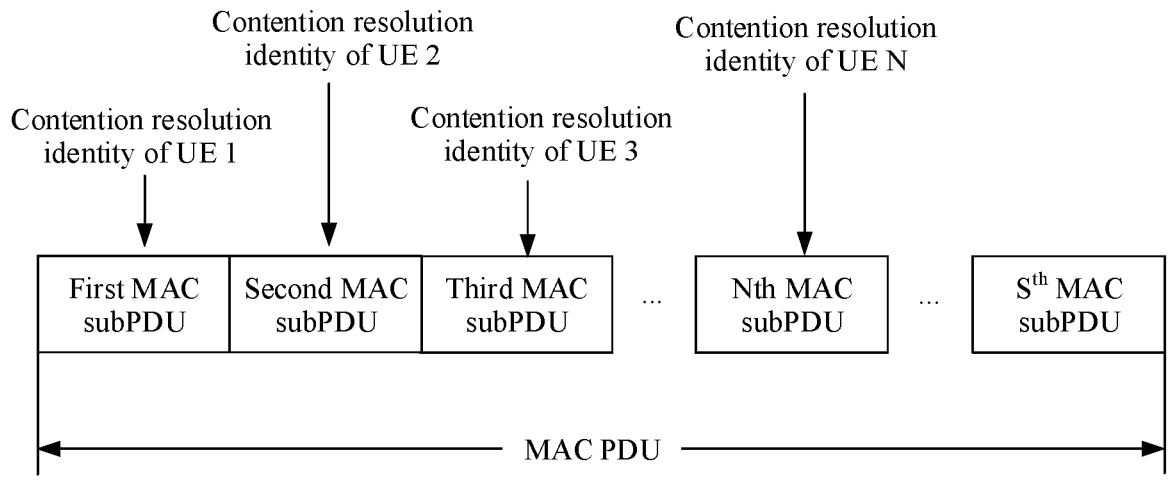
FIG. 16 is a schematic diagram of an example in which a response message in a second format is carried in a MAC PDU.

FIG. 16 is a schematic diagram of an example in which the response message in the second format is carried in the MAC PDU.

Specifically, in FIG. 16, the MAC PDU includes S MAC subPDUs, S is greater than or equal to N, and the N contention resolution identities are respectively carried in N MAC subPDUs. For example, contention resolution identities of terminal devices 1, 2, 3, and N may be respectively carried in first, second, third, and $N^{th}$ MAC subPDUs. In this way, response messages of a plurality of terminal devices can be multiplexed into a same MAC PDU, to improve radio resource utilization.

For schematic diagrams of structures after the first, second, third, and $N^{th}$ MAC subPDUs carry the contention resolution identities of the terminal devices 1, 2, 3, and N, refer to the schematic diagram of the structure of the first MAC subPDU in FIG. 9.

Optionally, the MAC PDU includes no control plane message corresponding to any one of the N terminal devices, so that response messages of more terminal devices can be multiplexed into the MAC PDU, or a size of the MAC PDU cannot be excessively large.

Optionally, in another implementation, the N contention resolution identities may alternatively be carried in more than or less than N MAC subPDUs. For example, a plurality of contention resolution identities may be multiplexed into one MAC subPDU, or one contention resolution identity is carried in one or more MAC subPDUs. This is not limited in this application.

Similarly, a response message of each terminal device may further include other content such as a timing advance command, a temporary C-RNTI, and an uplink grant. Therefore, the foregoing other content corresponding to the terminal device and a contention resolution identity of the response message may be carried in a same MAC subPDU (namely, the first MAC subPDU).

In other words, the first, second, third, and $N^{th}$ MAC subPDUs may further correspondingly carry other content of the terminal device 1, 2, 3, and N respectively. For structures in which the first, second, third, and $N^{th}$ MAC subPDUs carry the other content, refer to FIG. 11 to FIG. 16. For corresponding descriptions of the structures, refer to the foregoing related descriptions. Details are not described herein again in this application.

Step 330: The terminal device determines the message format of the response message.

Step 340: The terminal device parses the response message based on the determined message format of the response message.

Specifically, the terminal device may not know which specific message format is selected by the network device to send the response message (that is, in this case, the terminal device does not indicate the network device to use which message format to send the response message). Therefore, before parsing the response message, the terminal device first needs to determine the message format of the response message. The network device may indicate the message format of the response message in an explicit or implicit manner, and the terminal device may determine the used message format according to the indication. The network device may indicate the message format of the response message in any one of the following three manners.

Manner 1

Optionally, the method 300 further includes the following step.

Step 321: The network device sends indication information to the terminal device, where the indication information is used to indicate the message format of the response message.

Correspondingly, in step 321, the terminal device receives the indication information.

Correspondingly, in step 330, the terminal device determines the message format of the response message by using the indication information.

Specifically, an indication may be provided to the terminal device in an explicit indication manner, and the terminal device determines the message format of the response message based on the indication information. For example, the indication information is used to indicate whether there is the control plane message, or the indication information is used to indicate a unicast MAC PDU (for example, corresponding to the response message in the first format) or a multicast MAC PDU (for example, corresponding to the response message in the second format). When the indication information indicates that there is the control plane message, that is, when the indication information indicates that the message format of the response message is the first format, the terminal device parses the response message based on the message format (namely, the first format) of the response message corresponding to the control plane message.

Optionally, the indication information may be carried in a MAC PDU. For example, the indication information may be carried in a MAC subPDU in the MAC PDU or in a MAC subheader.

Optionally, the indication information may be carried in a reserved bit field in a MAC subheader. For example, whether a bit of the reserved bit field is 0 or 1 may indicate whether the message format of the response message is the first format or the second format.

Optionally, the indication information may alternatively be carried in a type indication field in a MAC subPDU, and the type indication field indicates whether the MAC subPDU has a fixed length or a variable length, to indirectly indicate whether the message format of the response message is the first format or the second format.

Optionally, the indication information may alternatively be carried in a MAC subPDU. For example, the MAC subPDU may be a dedicated MAC subPDU (for example, the third MAC subPDU in FIG. 8 or an $S^{th}$ MAC subPDU in FIG. 16), and is specially configured to carry the indication information.

Optionally, the indication information may alternatively be carried in DCI corresponding to the response message. The DCI is used to allocate a downlink resource, and the downlink resource is used to transmit the response message.

Manner 2

It may be specified in the system or the protocol, or may be agreed on by the network device and the terminal device that, in step 320, the response message may be sent according to the following rule:

when the message format of the response message determined by the network device is the first format, sending, by the network device, the response message in the first format by using a first radio network temporary identifier (RNTI); or when the message format of the response message determined by the network device is the second format, sending, by the network device, the response message in the second format by using a second RNTI.

Correspondingly, in step 320, the terminal device may receive the response message according to the following rule:

receiving, by the terminal device, the response message by using the first radio network temporary identifier (RNTI) and the second RNTI.

Correspondingly, in step 320, the terminal device determines the message format of the response message based on a receiving status of the response message.

It should be understood that, when sending the response message in the first format by using the first RNTI, specifically, the network device may scramble, by using the first RNTI, a cyclic redundancy check (CRC) of DCI corresponding to the response message in the first format, where the DCI is used to allocate a PDSCH resource, and the PDSCH resource is used to carry the response message in the first format.

Similarly, when sending the response message in the second format by using the second RNTI, specifically, the network device may scramble, by using the second RNTI, a CRC of DCI corresponding to the response message in the second format, where the DCI is used to allocate a PDSCH resource, and the PDSCH resource is used to carry the response message in the second format.

Correspondingly, when receiving the response message by using the first RNTI and the second RNTI, specifically, the terminal device may descramble, by using the first RNTI and the second RNTI, a CRC of the DCI corresponding to the response message.

After receiving the random access request message, the network device may generate an RNTI according to a preset rule based on the random access request message (for example, a time-frequency location of the preamble), where the RNTI is used to send the response message. Correspondingly, the terminal device also generates the RNTI according to a same rule, and receives the random access response by using the RNTI.

In this application, two sets of different RNTI rules, namely, a first RNTI rule and a second RNTI rule, may be separately configured for the network device and the terminal device. For a same random access request message, the first RNTI rule and the second RNTI rule may respectively generate the first RNTI and the second RNTI, where the first RNTI and the second RNTI respectively correspond to the response message in the first format and the response message in the second format, and the first RNTI and the second RNTI are different.

The network device selects a corresponding RNTI rule based on the determined message format to generate an RNTI, and sends the response message by using the RNTI.

The terminal device receives the response message by using both the first RNTI and the second RNTI, and determines the message format of the response message based on the receiving status of the response message.

For example, if successfully receiving the random access response by using the first RNTI, the terminal device may determine that the random access response is a random access response in the first format, that is, the message format is the first format.

For another example, if successfully receiving the random access response by using the second RNTI, the terminal device may determine that the random access response is a random access response in the second format, that is, the message format is the second format.

It should be understood that the "protocol" in this embodiment of this application may be the standard protocol in the communication field, for example, may include the LTE protocol, the NR protocol, and the related protocol applied to the future communication system. This is not limited in this application.

Manner 3

It may be specified in the system or the protocol, or may be agreed on by the network device and the terminal device that, in step 320, the network device may send the response message according to the following rule:

when the message format of the response message determined by the network device is the first format, sending, by the network device on a first resource set, the DCI corresponding to the response message in the first format; or when the message format of the response message determined by the network device is the second format, sending, by the network device on a second resource set, the DCI corresponding to the response message in the second format.

Correspondingly, in step 320, the terminal device may monitor, according to the following rule, the DCI corresponding to the response message:

monitoring, by the terminal device, on the first resource set and the second resource set, the DCI corresponding to the response message.

Correspondingly, in step 320, the terminal device determines the message format of the response message based on a monitoring status of the DCI corresponding to the response message.

In this application, two sets of different resource sets, namely, the first resource set and the second resource set, may be separately configured for the network device and the terminal device. The first resource set corresponds to the response message in the first format, and the DCI corresponding to the response message in the first format may be from using the first resource set. The second resource set corresponds to the response message in the second format, and the DCI corresponding to the response message in the second format may be from using the second resource set. The first resource set does not overlap the second resource set.

Optionally, the first resource set may include a control channel resource set (CORESET) and/or searching space.

Optionally, the second resource set may include a control channel resource set and/or searching space.

The network device selects, based on the determined message format, a corresponding resource set to send the DCI corresponding to the response message.

The terminal device receives, on both the first resource set and the second resource set, the DCI corresponding to the response message, and determines the message format of the response message based on a receiving status of the DCI corresponding to the response message.

For example, if successfully obtaining, through monitoring on the first resource set, the DCI corresponding to the random access response, the terminal device may determine that the random access response is the random access response in the first format, that is, the message format is the first format.

For another example, if successfully obtaining, through monitoring on the second resource set, the DCI corresponding to the random access response, the terminal device may determine that the random access response is the random access response in the second format, that is, the message format is the second format.

The first resource set and the second resource set may be specified in the system or the protocol, or may be agreed on by the network device and the terminal device. For example, the network device may configure the terminal device by using semi-static signaling or dynamic signaling. The semi-static signaling may be, for example, RRC signaling. The dynamic signaling may be, for example, a MAC CE or DCI.

It should be understood that the "protocol" in this embodiment of this application may be the standard protocol in the communication field, for example, may include the LTE protocol, the NR protocol, and the related protocol applied to the future communication system. This is not limited in this application.

In step 340, the terminal device parses the response message based on the determined message format of the response message.

Specifically, after determining the message format of the response message, the terminal device may learn of a specific meaning of each bit in the response message according to a preset rule, and may parse the response message in a corresponding manner, to learn of message content of the response message.

For example, when determining that the message format of the response message is the first format, the terminal device parses the response message based on the first format.

For another example, when determining that the message format of the response message is the second format, the terminal device parses the response message based on the second format.

This embodiment of this application provides two message formats of the response message, and the network device can select, based on the specific case, either message format to send the response message to the terminal device. For example, to enable the terminal device to receive the control plane message as soon as possible, the network device may send the response message to the terminal device by using the first format. For another example, to multiplex response messages of as many terminal devices as possible together and to improve radio resource utilization, the network device may send the response message to the terminal device by using the second format. Through the foregoing settings, the random access response is more flexible and efficient, and different usage requirements can be satisfied.

Figure 17:
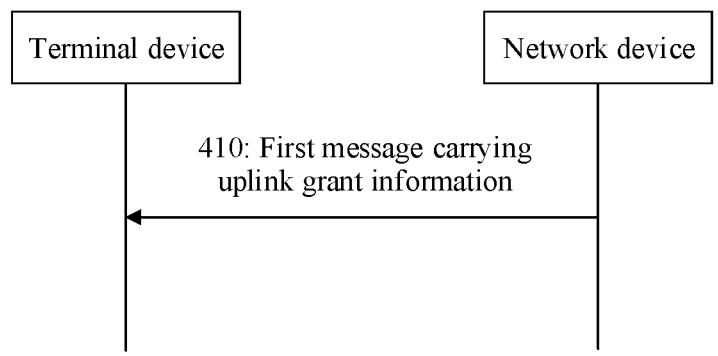
FIG. 17 is a schematic flowchart of another example of a random access method according to this application.

FIG. 17 is a schematic flowchart of a two-step random access method 400 according to this application. With reference to FIG. 17, the following describes the random access method 400 provided in this embodiment of this application. The method 400 includes the following steps.

Step 410: A network device sends a first message to a terminal device on a PDSCH resource, where the first message carries uplink grant information.

Specifically, the network device first receives a random access request message (corresponding to MsgA in the foregoing two-step random access) from the terminal device. The random access request message includes a random access signal and payload data. The random access signal may be a preamble and/or a DMRS. Content included in the payload data may be different in different random access triggering scenarios. For example, the payload data may include a C-RNTI. In this embodiment, the random access triggering scenario may be any one of handover, uplink data arrival and uplink out-of-synchronization, downlink data arrival and uplink out-of-synchronization, beam failure recovery, and the like.

Further, after receiving the random access request message, the network device needs to decode the random access signal and the payload data that are included in the random access request message. In this embodiment, results of decoding the random access signal and the payload data by the network device may be the case 2 and the case 4 in the foregoing Table 3. That is, the network device should successfully decode the payload data, and the result of decoding the random access signal may not be required.

After receiving the random access request message and successfully decoding the payload data, the network device may generate corresponding response information based on content in the payload data. In this embodiment, the response information includes at least uplink grant information.

In this embodiment, the network device may send the first message to the terminal device on the PDSCH resource, where the first message carries the uplink grant information, and the first information does not need to be sent on a PDCCH resource, so that the terminal device can receive the first message as soon as possible, and the terminal device can send newly transmitted data or perform retransmission to the network device as soon as possible.

Optionally, in step 410, the network device may send the first message to the terminal device on the PDSCH resource by using a C-RNTI.

Specifically, the network device may scramble a PDCCH by using the C-RNTI, a CRC of corresponding DCI is scrambled by using the C-RNTI. The PDSCH resource is allocated by using the DCI. The first message is sent on the PDSCH resource.

Optionally, after the terminal device receives the first message, the method further includes:

sending, by the terminal device, the newly transmitted data to the network device.

Optionally, after the terminal device receives the first message, the method further includes:

performing, by the terminal device, the retransmission to the network device.

Optionally, the first message further includes transmission indication information, where the transmission indication information is used to indicate the terminal device to send the newly transmitted data or perform the retransmission.

Optionally, when the terminal device determines that the transmission indication information indicates new transmission, the terminal device generates a MAC PDU, and delivers the MAC PDU to a HARQ entity, to perform HARQ transmission.

The foregoing describes in detail the methods for the response message in the embodiments of this application with reference to FIG. 1 to FIG. 17. The following describes in detail apparatuses in the embodiments of this application with reference to FIG. 18 to FIG. 21. It should be understood that the apparatuses shown in FIG. 18 to FIG. 21 can implement one or more steps in the method procedures shown in FIG. 7 and FIG. 17. To avoid repetition, details are not described herein again.

Figure 18:
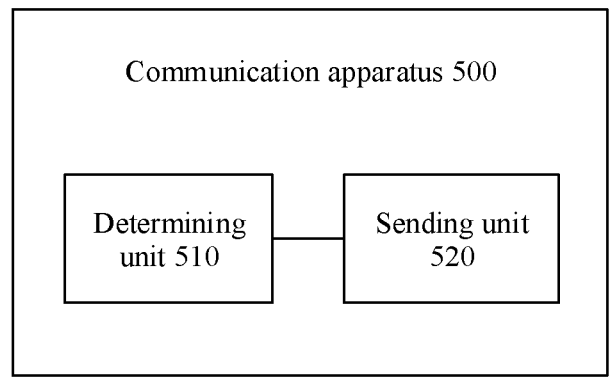
FIG. 18 is a schematic diagram of a communication device according to an embodiment of this application.

FIG. 18 is a schematic diagram of a communication device according to an embodiment of this application. The communication apparatus 500 shown in FIG. 18 includes a determining unit 510 and a sending unit 520.

The determining unit 510 is configured to determine a message format of a response message, where the message format includes a first format or a second format, the response message in the first format includes a contention resolution identity and a control plane message, and the response message in the second format includes a contention resolution identity, and includes no control plane message.

The sending unit 520 is configured to send the response message to a terminal device by using the determined message format of the response message.

Optionally, the response message in the first format or the response message in the second format is carried in a medium access control (MAC) protocol data unit (PDU).

Optionally, the MAC PDU includes a first MAC subPDU and a second MAC subPDU, the contention resolution identity in the response message in the first format is carried in the first MAC subPDU, and the control plane message in the response message in the first format is carried in the second MAC subPDU.

Optionally, the response message in the second format includes N contention resolution identities corresponding to N terminal devices, the N contention resolution identities are carried in the MAC PDU, and N is an integer greater than or equal to 2.

Optionally, the MAC PDU includes S MAC subPDUs, S is greater than or equal to N, and the N contention resolution identities are respectively carried in N MAC subPDUs.

Optionally, the sending unit 520 is further configured to send indication information to the terminal device, where the indication information is used to indicate the message format of the response message.

Optionally, when the message format of the response message determined by the determining unit 510 is the first format, the sending unit 520 sends the response message in the first format by using a first radio network temporary identifier (RNTI); or when the message format of the response message determined by the determining unit 510 is the second format, the sending unit 520 sends the response message in the second format by using a second RNTI.

Optionally, when the message format of the response message determined by the determining unit 510 is the first format, the sending unit 520 sends, on a first resource set, downlink control information (DCI) corresponding to the response message in the first format; or when the message format of the response message determined by the determining unit 510 is the second format, the sending unit 520 sends, on a second resource set, DCI corresponding to the response message in the second format.

Optionally, the first resource set includes a control channel resource set and/or searching space, and the second resource set includes a control channel resource set and/or searching space.

Optionally, the indication information is carried in the MAC PDU, or the indication information is carried in DCI corresponding to the response message.

Optionally, the response message in the first format or the response message in the second format further includes at least one of the following information: a timing advance command, a temporary cell radio network temporary identifier (C-RNTI), and an uplink grant.

Optionally, the control plane message includes any one of the following messages: radio resource control (RRC) connection setup, RRC resume, and RRC reestablishment.

In a possible implementation, the communication apparatus 500 may be a network device, for example, a base station 80 described below. A function of the determining unit may be implemented by a processor 8022 in the base station, and a function of the sending unit may be implemented by using an RRU 801 in the base station 80. The following describes a structure of the network device in the embodiments of this application with reference to FIG. 19.

Figure 19:
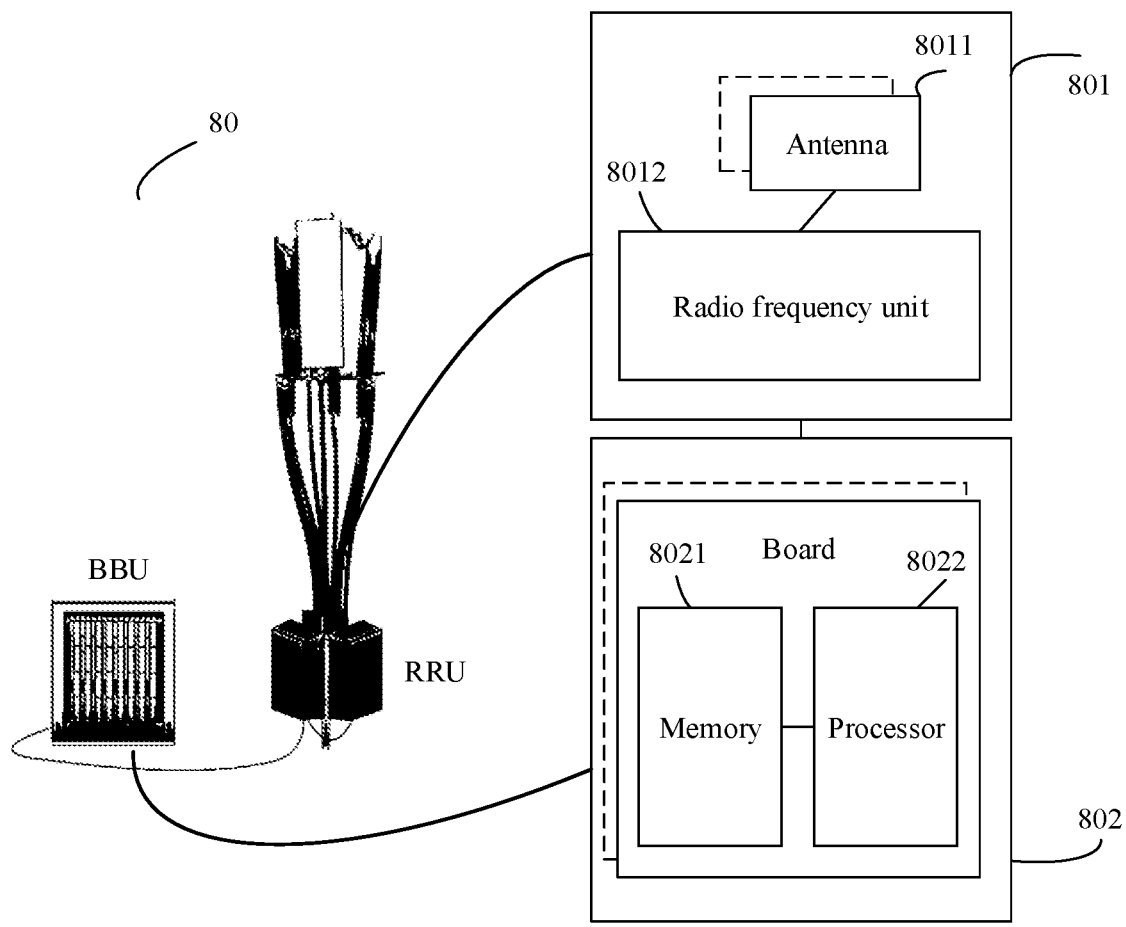
FIG. 19 is a schematic diagram of a structure of a network device according to an embodiment of this application.

FIG. 19 is a schematic diagram of a structure of a network device according to an embodiment of this application. For example, FIG. 19 may be a schematic diagram of a structure of the base station. As shown in FIG. 19, the base station may be used in the system shown in FIG. 1, and perform a function of the network device in the method embodiments. The base station 80 may include one or more radio frequency units such as the remote radio unit (RRU) 801 and one or more baseband units (BBUs) (which may also be referred to as a digital unit, DU) 802. The RRU 801 may be referred to as a transceiver unit, a transceiver, a transceiver circuit, or the like, and may include at least one antenna 8011 and a radio frequency unit 8012. The RRU 801 is mainly configured to: send and receive a radio frequency signal, and perform conversion between a radio frequency signal and a baseband signal. For example, the RRU 801 is configured to send the signaling message in the foregoing embodiments to a terminal device. The BBU 802 is mainly configured to: perform baseband processing, control the base station, and so on. The RRU 801 and the BBU 802 may be physically disposed together, or may be physically separated, that is, in a distributed base station.

The BBU 802 is a control center of the base station, may also be referred to as a processing unit, and is mainly configured to implement baseband processing functions such as channel coding, multiplexing, modulation, and spectrum spreading. For example, the BBU (the processing unit) 802 may be configured to control the base station to perform an operation procedure related to the network device in the method embodiments.

In an example, the BBU 802 may include one or more boards. A plurality of boards may jointly support a radio access network (for example, an LTE network) of a single access standard, or may separately support radio access networks (for example, the LTE network, a 5G network, or another network) of different access standards. The BBU 802 further includes a memory 8021 and the processor 8022. The memory 8021 is configured to store necessary instructions and data. The processor 8022 is configured to control the base station to perform a necessary action, for example, configured to control the base station to perform the operation procedure related to the network device in the foregoing method embodiments. The memory 8021 and the processor 8022 may serve the one or more boards. In other words, the memory and the processor may be independently disposed on each board. Alternatively, the plurality of boards may share a same memory and processor. In addition, a necessary circuit may further be disposed on each board.

Figure 20:
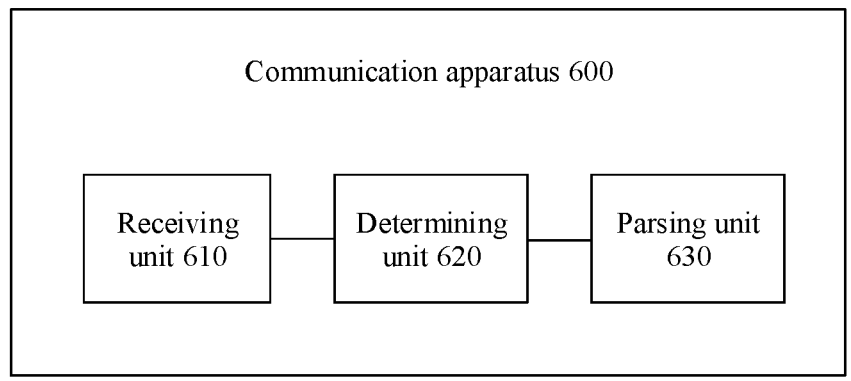
FIG. 20 is a schematic diagram of a communication device according to another embodiment of this application.

FIG. 20 is a schematic diagram of a communication device according to another embodiment of this application. The communication apparatus 600 shown in FIG. 20 includes a receiving unit 610, a determining unit 620, and a parsing unit 630.

The receiving unit 610 is configured to receive a response message from a network device.

The determining unit 620 is configured to determine a message format of the response message, where the message format includes a first format or a second format, the response message in the first format includes a contention resolution identity and a control plane message, and the response message in the second format includes a contention resolution identity, and includes no control plane message.

The parsing unit 630 is configured to parse the response message based on the determined message format of the response message.

Optionally, the response message in the first format or the response message in the second format is carried in a medium access control (MAC) protocol data unit (PDU).

Optionally, the MAC PDU includes a first MAC subPDU and a second MAC subPDU, the contention resolution identity in the response message in the first format is carried in the first MAC subPDU, and the control plane message in the response message in the first format is carried in the second MAC subPDU.

Optionally, the response message in the second format includes N contention resolution identities corresponding to N terminal devices, the N contention resolution identities are carried in the MAC PDU, and N is an integer greater than or equal to 2.

Optionally, the MAC PDU includes S MAC subPDUs, S is greater than or equal to N, and the N contention resolution identities are respectively carried in N MAC subPDUs.

Optionally, the receiving unit 610 receives the response message by using a first radio network temporary identifier (RNTI) and a second RNTI. The determining unit 620 determines the message format of the response message based on a receiving status of the response message.

Optionally, the receiving unit 610 monitors, on a first resource set and a second resource set, DCI corresponding to the response message. The determining unit 620 determines the message format of the response message based on a monitoring status of the DCI corresponding to the response message.

Optionally, the first resource set includes a control channel resource set and/or searching space, and the second resource set includes a control channel resource set and/or searching space.

Optionally, indication information is carried in the MAC PDU, or the indication information is carried in DCI corresponding to the response message.

Optionally, the response message in the first format or the response message in the second format further includes at least one of the following information: a timing advance command, a temporary cell radio network temporary identifier (C-RNTI), and an uplink grant.

Optionally, the control plane message includes any one of the following messages: radio resource control (RRC) connection setup, RRC resume, and RRC reestablishment.

In a possible implementation, the communication apparatus 600 may be a terminal device 70. A function of the determining unit may be implemented by using a processor 702 in the terminal device, and a function of the sending unit may be implemented by using a transceiver 701 (that is, a combination of a control circuit and an antenna) in the terminal device. The following describes a structure of the terminal device in the embodiments of this application with reference to FIG. 21.

Figure 21:
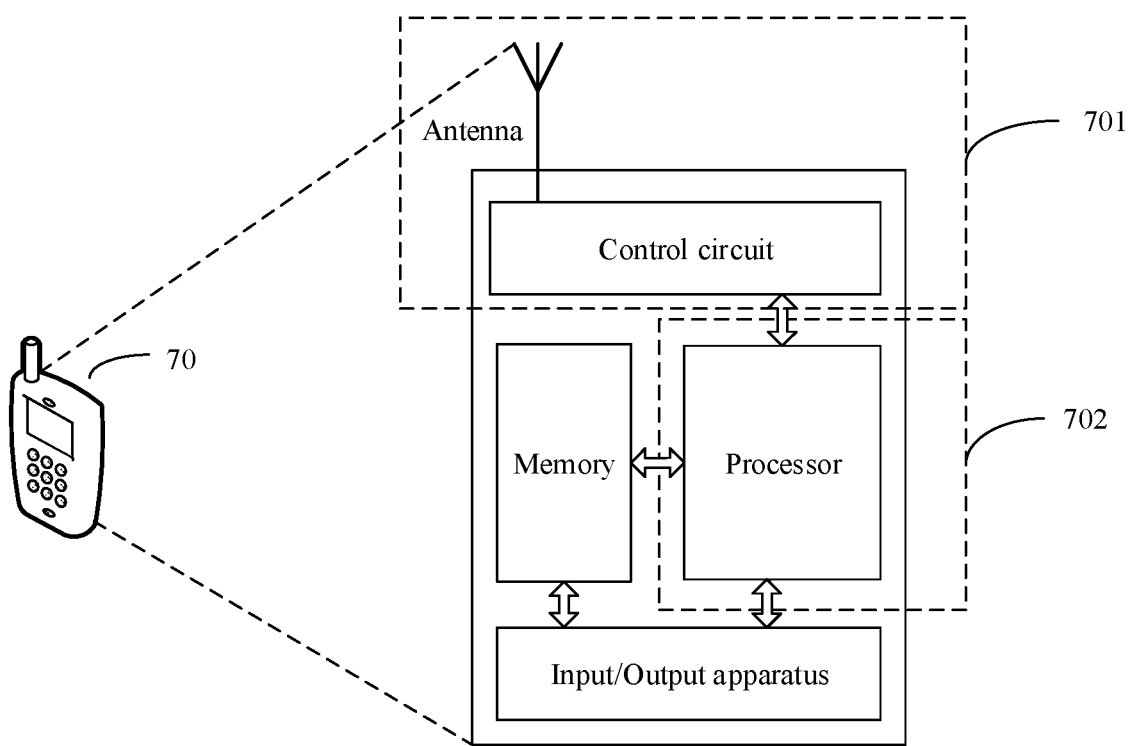
FIG. 21 is a schematic diagram of a structure of a terminal device according to an embodiment of this application.

FIG. 21 is a schematic diagram of a structure of a terminal device according to an embodiment of this application. The terminal device may be used in the system shown in FIG. 1, and performs a function of the terminal device in the foregoing method embodiments. For ease of description, FIG. 21 shows only main components of the terminal device. As shown in FIG. 21, the terminal device 70 includes the processor, a memory, the control circuit, the antenna, and an input/output apparatus. The processor is mainly configured to process a communication protocol and communication data, control the entire terminal device, execute a software program, and process data of the software program, for example, configured to support the terminal device in performing actions described in the foregoing method embodiments. The memory is mainly configured to store the software program and the data. The control circuit is mainly configured to: perform conversion between a baseband signal and a radio frequency signal, and process the radio frequency signal. The combination of the control circuit and the antenna may also be referred to as the transceiver that is mainly configured to send and receive a radio frequency signal in an electromagnetic wave form. The input/output apparatus, such as a touchscreen, a display, or a keyboard, is mainly configured to: receive data input by a user and output data to the user.

After the terminal device is powered on, the processor may read a software program in a storage unit, explain and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 21 shows only one memory and one processor. In an actual terminal device, there may be a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 21. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of the software program. The processor executes the software program to implement a baseband processing function.

It should be understood that, the processor in the embodiments of this application may be a central processing unit (CPU). The processor may alternatively be another general-purpose processor, a digital signal processor (DSP), an application specific integrated circuit (ASIC), a field programmable gate array (FPGA), or another programmable logic device, a discrete gate or a transistor logic device, a discrete hardware component, or the like. The general purpose processor may be a microprocessor, or the processor may be any conventional processor or the like.

It should be further understood that the memory in the embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, random access memories (RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

According to the methods provided in the embodiments of this application, this application further provides a computer program product. The computer program product includes computer program code. When the computer program code is run on a computer, the computer is enabled to perform the method in any one of the embodiments shown in FIG. 7 or FIG. 17.

According to the methods provided in the embodiments of this application, this application further provides a computer-readable medium. The computer-readable medium stores program code. When the program code is run on a computer, the computer is enabled to perform the method in any one of the embodiments shown in FIG. 7 or FIG. 17.

According to the methods provided in the embodiments of this application, this application further provides a system, including the foregoing one or more terminal devices and one or more network devices.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

For ease of understanding, the following describes terms in a process of describing the solutions in this application.

In the embodiments of this application, "indications" may include a direct indication and an indirect indication, and may also include an explicit indication and an implicit indication. Information indicated by using a piece of information (for example, the indication information described above) is referred to as to-be-indicated information. In a specific implementation process, the to-be-indicated information is indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may also be indicated by using a pre-agreed (for example, stipulated in a protocol) arrangement sequence of various pieces of information, to reduce indication overheads to some extent.

In the embodiments of this application, terms and English abbreviations such as a medium access control protocol data unit (MAC PDU), a cell radio network temporary identifier (C-RNTI), downlink control information (DCI), a medium access control control element (MAC CE), radio resource control (RRC), and a physical downlink control channel (PDCCH) are all examples provided for ease of description, and should not constitute any limitation on this application. This application does not exclude a possibility of defining another term that can implement a same or similar function in an existing protocol or a future protocol.

In the embodiments of this application, "first", "second", and various numbers are merely used for differentiation for ease of description, and are not used to limit the scope of the embodiments of this application. For example, the numbers are used to distinguish different MAC subPDUs.

In the embodiments of this application, the "communication protocol" may be a standard protocol in the communication field, for example, may include an LTE protocol, an NR protocol, and a related protocol applied to a future communication system. This is not limited in this application.

The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Sequence numbers of the foregoing processes do not mean execution sequences in the embodiments of this application. The execution sequences of the processes should be determined based on functions and internal logic of the processes, and should not be constructed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A two-step random access method comprising:
sending, by a terminal device, a random access request message to a network device, wherein the random access request message includes a preamble and payload data;
receiving, by the terminal device, a response message from the network device,
wherein the response message is known by the terminal device to be a response in a two-step random access method;
determining, by the terminal device, a message format of the response message based on indication information received by the terminal device from the network device,
wherein the message format comprises a first format or a second format; and
parsing, by the terminal device, the response message based on the determined message format for the purpose of determining whether the response message is for the terminal device,
wherein the response message in the first format comprises a contention resolution identity and a radio resource control (RRC) message,
wherein the response message in the second format comprises a contention resolution identity without any RRC message,
wherein both the indication information and the response message in the first format and in the second format are carried in a medium access control (MAC) protocol data unit (PDU),
wherein the MAC PDU comprises a first MAC subPDU and a second MAC subPDU,
wherein the contention resolution identity in the response message in the first format is carried in the first MAC subPDU, and
wherein a control plane message in the response message in the first format is carried in the second MAC subPDU.

2. The method according to claim 1, wherein the response message in the second format comprises N contention resolution identities associated with N terminal devices, the N contention resolution identities are carried in the MAC PDU, and N is an integer greater than or equal to 2.

3. The method according to claim 2, wherein the MAC PDU comprises S MAC subPDUs, S is greater than or equal to N, and the N contention resolution identities are respectively carried in N MAC subPDUs.

4. The method according to claim 1, wherein the response message in the first format or the response message in the second format further comprises at least one of the following information: a timing advance command, a temporary cell radio network temporary identifier (C-RNTI), and an uplink grant.

5. The method according to claim 1, wherein the second format does not include the control plane message or another control message.

6. The method according to claim 1, wherein the indication information is carried in the first or second MAC subPDU or in a MAC subheader.

7. The method according to claim 6, wherein the indication information is carried in a reserved bit field in the MAC subheader or in a type indication field in the first or second MAC subPDU.

8. An apparatus comprising:
a non-transitory memory; and
one or more processors coupled to the memory, wherein the one or more processors are configured to:
send a random access request message to a network device, wherein the random access request message includes a preamble and payload data;
receive a response message from the network device,
wherein the response message is known by the apparatus to be a response in a two-step random access method;
determine a message format of the response message based on indication information received by the apparatus from the network device,
wherein the message format comprises a first format or a second format; and
parse the response message based on the determined message format for the purpose of determining whether the response message is for the apparatus,
wherein the response message in the first format comprises a contention resolution identity and a radio resource control (RRC) message,
wherein the response message in the second format comprises a contention resolution identity without any RRC message,
wherein both the indication information and the response message in the first format and in the second format are carried in a medium access control (MAC) protocol data unit (PDU),
wherein the MAC PDU comprises a first MAC subPDU and a second MAC subPDU,
wherein the contention resolution identity in the response message in the first format is carried in the first MAC subPDU, and
wherein a control plane message in the response message in the first format is carried in the second MAC subPDU.

9. The apparatus according to claim 8, wherein the response message in the first format or the response message in the second format further comprises at least one of the following information a timing advance command, a temporary cell radio network temporary identifier (C-RNTI) and an uplink grant.

10. The apparatus according to claim 8, wherein the second format does not include the control plane message or another control message.

11. The apparatus according to claim 8, wherein the response message in the second format comprises N contention resolution identities associated with N terminal devices, the N contention resolution identities are carried in the MAC PDU, and N is an integer greater than or equal to 2.

12. The apparatus according to claim 8, wherein the response message in the first format or the response message in the second format further comprises at least one of the following information: a timing advance command, a temporary cell radio network temporary identifier (C-RNTI), and an uplink grant.

13. The apparatus according to claim 8, wherein the indication information is carried in the first or second MAC subPDU or in a MAC subheader.

14. The apparatus according to claim 13, wherein the indication information is carried in a reserved bit field in the MAC subheader or in a type indication field in the first or second MAC subPDU.

15. An apparatus comprises:
a non-transitory memory; and
one or more processors coupled to the memory, wherein the one or more processors are configured to:
- receive a random access request message from a terminal device, wherein the random access request message includes a preamble and payload data;
- determine a message format of a response message, wherein the message format is indicated by indication information associated with the response message; and
- send the indication information and the response message to the terminal device in the determined message format,
  - wherein the response message is known by the terminal device to be a response in a two-step random access method,
  - wherein the response message in the first format comprises a contention resolution identity and a radio resource control (RRC) message,
  - wherein the response message in the second format comprises a contention resolution identity without any RRC message,
  - wherein both the indication information and the response message in the first format and in the second format are carried in a medium access control (MAC) protocol data unit (PDU),
  - wherein the MAC PDU comprises a first MAC subPDU and a second MAC subPDU,
  - wherein the contention resolution identity in the response message in the first format is carried in the first MAC subPDU, and
  - wherein a control plane message in the response message in the first format is carried in the second MAC subPDU.

16. The apparatus according to claim 15, wherein the response message in the first format or the response message in the second format further comprises at least one of the following information: a timing advance command, a temporary cell radio network temporary identifier (C-RNTI), and an uplink grant.

17. The apparatus according to claim 15, wherein the second format does not include the control plane message or another control message.

18. The apparatus according to claim 15, wherein the response message in the second format comprises N contention resolution identities associated with N terminal devices, the N contention resolution identities are carried in the MAC PDU, and N is an integer greater than or equal to 2.

19. The apparatus according to claim 15, wherein the response message in the first format or the response message in the second format further comprises at least one of the following information: a timing advance command, a temporary cell radio network temporary identifier (C-RNTI), and an uplink grant.

20. The apparatus according to claim 15, wherein the indication information is carried in the first or second MAC subPDU or in a MAC subheader.

* * * * *